(12) United States Patent
Hirotsune

(10) Patent No.: US 7,948,861 B2
(45) Date of Patent: May 24, 2011

(54) OPTICAL DISK AND RECORDING METHOD OF VISIBLE FIGURES INTO OPTICAL DISK

(75) Inventor: Akemi Hirotsune, Saitama (JP)

(73) Assignee: Hitachi, Ltd., Tokyo (JP)

( * ) Notice: Subject to any disclaimer, the term of this patent is extended or adjusted under 35 U.S.C. 154(b) by 1065 days.

(21) Appl. No.: 11/738,663

(22) Filed: Apr. 23, 2007

(65) Prior Publication Data

US 2007/0247513 A1    Oct. 25, 2007

(30) Foreign Application Priority Data

Apr. 25, 2006   (JP) ................. 2006-120888

(51) Int. Cl.
B41J 2/435    (2006.01)
G11B 3/70    (2006.01)
(52) U.S. Cl. ................... 369/284; 347/224
(58) Field of Classification Search .......... 347/224; 369/108
See application file for complete search history.

(56) References Cited

U.S. PATENT DOCUMENTS

| 2002/0191517 A1* | 12/2002 | Honda et al. ........ 369/53.29 |
| 2003/0001943 A1 | 1/2003 | Hirotsune |
| 2003/0179679 A1* | 9/2003 | Morishima ........ 369/108 |
| 2004/0184370 A1 | 9/2004 | Morishima |
| 2007/0238613 A1* | 10/2007 | Brocklin et al. ........ 503/226 |

FOREIGN PATENT DOCUMENTS

| JP | 2003-016649 | 1/2003 |
| JP | 2004-171605 | 6/2004 |

OTHER PUBLICATIONS

D. Stinson, et al., " LightScribe Direct Disc Labeling", ISOM/ODS2005 Technical Digest, MA4, Jul. 2005.
"Joint Development of 'Labelflash™ Technology' to Enable Writing on Disk Label Surface Using Data Recording Laser of a Recordable DVD Drive", http://www.fujifillm.co.jp/news_r/nrj1423.html Oct. 2005.

* cited by examiner

Primary Examiner — Matthew Luu
Assistant Examiner — Kendrick X Liu
(74) Attorney, Agent, or Firm — Antonelli, Terry, Stout & Kraus, LLP.

(57) ABSTRACT

Multicolor characters or pictures are written in an optical disk in a visible manner. The optical disk comprises a figure writing layer for writing a visible figure in addition to a data recording layer for recording data. Recording of user data in the data recording layer and the writing of a visible figure in the figure writing layer are performed using the same optical disk drive. In one example, the figure writing layer comprises phase change layers that are formed via protection layers in a region sandwiched between a pair of reflective layers. By writing figure data separated into individual basic colors in the phase change layers individually, a multicolor figure can be made visible.

6 Claims, 20 Drawing Sheets

ENLARGED VIEW

CRYSTALLINE REGION

NON-CRYSTALLINE REGION 0.01 mm or greater

RED

GREEN

BLUE

OPTICAL DISK AND RECORDING METHOD OF VISIBLE FIGURES INTO OPTICAL DISK

CLAIM OF PRIORITY

The present application claims priority from Japanese application JP 2006-120888 filed on Apr. 25, 2006, the content of which is hereby incorporated by reference into this application.

BACKGROUND OF THE INVENTION

1. Field of the Invention

The present invention relates to a method of writing a figure visible to the naked eye, such as a character, picture, and the like, on an optical disk, and an optical disk suitable for such method.

2. Background Art

Major features of optical disks include the fact that the recording medium (disk) can be removed from the recording/reproduction unit and that the recording medium is inexpensive. The user can remove the medium from the unit and affix a label or write characters on it with a pen in order to indicate the recorded content and distinguish from other disks. Since such labels or written characters and the like are on the uppermost surface of the disk, they tend to become soiled or peeled during handling, resulting in a difficulty in reading them and a soiled appearance.

Various display technologies have been proposed to replace the aforementioned labels or written characters, as disclosed in JP Patent Publication (Kokai) No. 2003-016649 A, ISOM/ODS2005 Technical Digest, MA4 (LightScribe), and "Joint Development of 'Labelflash™ Technology' to Enable Writing on Disk Label Surface Using Data Recording Laser of a Recordable DVD Drive" (2005.10.19): http://www.fujifilm.co.jp/news_r/nrj1423.html. These technologies enable the drawing (writing) of characters or pictures using changes in reflectivity in the small-sized bits recorded in an optical disk which are not visible to the naked eye but which are visible when a large number of them are gathered. JP Patent Publication (Kokai) No. 2004-171605 A discloses a technique involving a diffraction grating in which a change in color depending on the angle of view is utilized.

SUMMARY OF THE INVENTION

In such conventional methods, the characters or pictures visible to the naked eye are either single-colored or have their color changed depending on angle.

The present invention provides a novel method of writing visible and multicolor information on an optical disk, and an optical disk suitable for such method.

An optical disk of the invention includes a figure writing layer for writing a visible figure in addition to a data recording layer for recording data. Recording of user data in the data recording layer and writing of a visible figure in the figure writing layer are performed using the same optical disk drive. The figure writing layer may comprise a reflective layer and a plurality of layers formed via protection layers on the side opposite to the data recording layer with respect to the reflective layer, the plurality of layers whose atomic arrangement is changed with energy irradiation. Alternatively, the figure writing layer may comprise a plurality of electrochromic layers each sandwiched between a pair of electrode layers and having a different reflectivity peak wavelength. By writing figure data separated into individual basic colors in the layers of the figure writing layer individually, a multicolor figure can be made visible.

When writing a visible figure in the optical disk having the figure writing layer which comprises the plurality of layers whose atomic arrangement is changed by energy irradiation, figure data for figure writing is read from a host. The figure data that has been read is expanded on a writing coordinates system, and the figure data is separated into color data for each basic color. The writing coordinates system is transformed into coordinates on the optical disk, and, based on the shape data and color data expanded on the coordinates on the optical disk, a laser drive pattern is generated on a track by track basis. Based on the laser drive pattern, a laser light source is driven so as to irradiate the figure writing layer of the optical disk with an optical pulse, whereby a visible figure is written.

When writing a visible figure in the optical disk having the figure writing layer which comprises the plurality of electrochromic layers each sandwiched between the pair of electrode layers and having different reflectivity peak wavelengths, figure data for figure writing is read from a host. The figure data is separated into shape data and color data for each basic color, and the figure data is separated into color data for each basic color. The shape data tat has been read is expanded in a writing coordinates system, which is transformed into coordinates on the optical disk. Based on the shape data and color data expanded on the disk coordinates, a laser drive pattern is generated on a track by track basis. A voltage is applied to the first electrochromic layer, and the laser light source is driven based on the laser drive pattern for the first electrochromic layer on a track by track basis so as to irradiate figure writing layer with an optical pulse. The application of voltage to the first electrochromic layer is then terminated, and a voltage is applied to the second electrochromic layer. Based on the laser drive pattern for the second electrochromic layer on a track by track basis, the laser light source is driven so as to irradiate the figure writing layer with an optical pulse and write a visible figure therein.

In accordance with the invention, multicolor and visible information can be written on an optical disk for the purpose of identifying the optical disk

DESCRIPTION OF THE PREFERRED
EMBODIMENTS OF THE INVENTION

In the following, embodiments of the invention are described with reference to the drawings.

Embodiment 1

Figure 1:
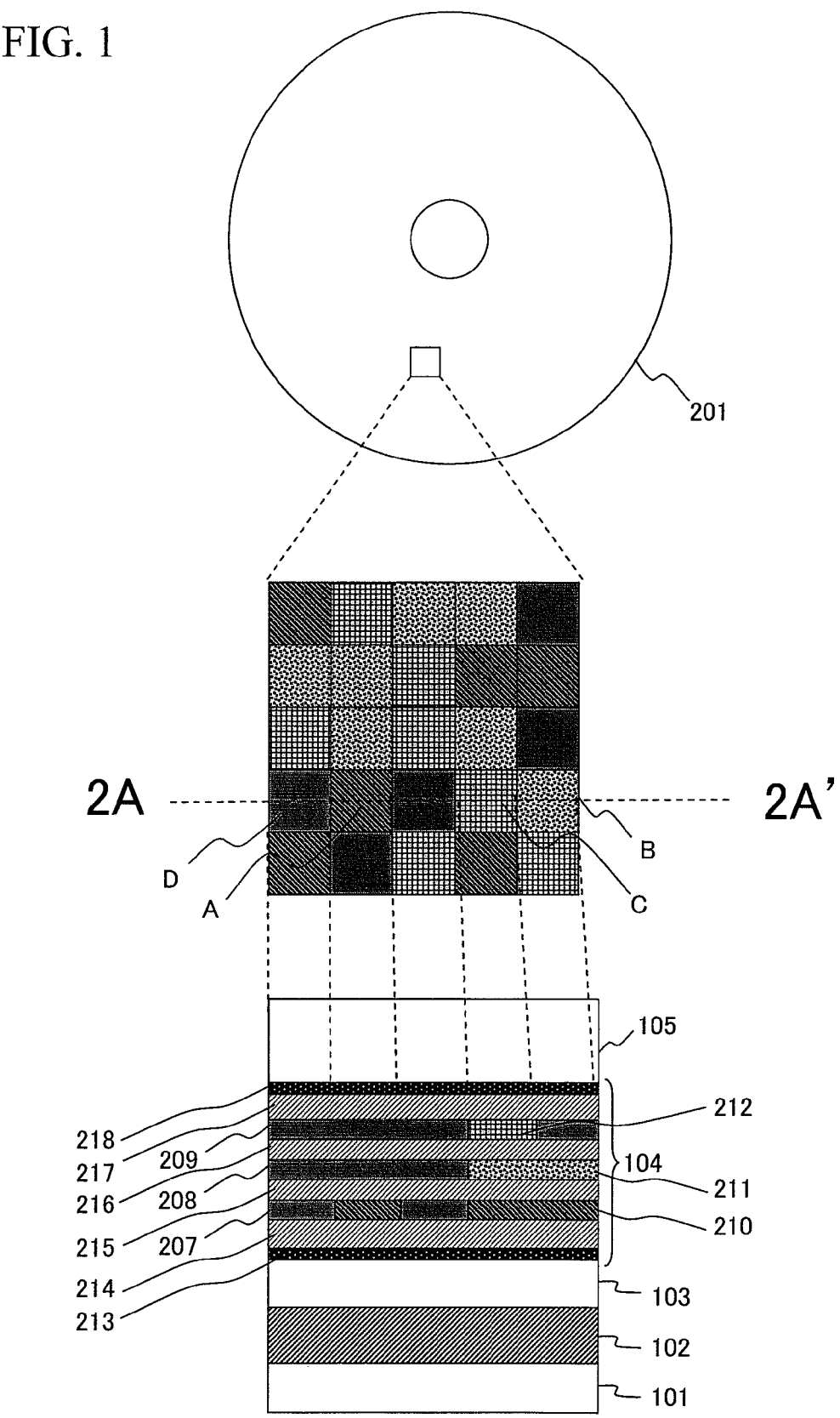
FIG. 1 schematically shows a configuration of an optical disk according to the invention.

FIG. 1 schematically shows an example of the configuration of an optical disk of the invention. An optical disk 201 includes a figure writing layer 104 in which a visible figure is written, and a data recording layer 102 for the recording of normal user data. The figure writing layer 104 includes three layers 207, 208, and 209 having different melting points and crystallization temperatures in which an atomic arrangement change is caused by a phase change. It also includes protection layers 214, 215, 216, and 217 disposed such that the individual phase change layers are sandwiched thereby. It further includes a light-incident-side reflective layer 213 and a back-side reflective layer 218. The state shown schematically in FIG. 1 is that of the disk after the figure writing layer 104 has been subjected to visible figure writing.

The optical disk 201 was fabricated in the following manner. On a substrate 101 having a tracking groove or pattern, the data recording layer 102 of $ZnS-SiO_2$, Ge—Sb—Te, and $ZnS-SiO_2$ was formed. Meanwhile, on a protection substrate 105 having a tracking groove or pattern, the back-side reflective layer 218 of Ag—Pd—Cu was formed to a thickness of 10 nm; the protection layer 217 of $ZnS-SiO_2$ was formed to a thickness of 80 nm; the phase change layer 209 of $Ge_5Sb_{90}Te_5$ was formed to a thickness of 15 nm; the protection layer 216 of $ZnS-SiO_2$ was formed to a thickness of 5 nm; the phase-change layer 208 of $Ge_5Sb_{80}Te_{15}$ was formed to a thickness of 10 nm; the protection layer 215 of $ZnS-SiO_2$ was formed to a thickness of 40 nm; the phase change layer 207 of $Ge_5Sb_{70}Te_{25}$ was formed to a thickness of 5 nm; the protection layer 214 of $ZnS-SiO_2$ was formed to a thickness of 20 nm; and the light-incident-side reflective layer 213 of Ag—Pd—Cu was formed to a thickness of 10 nm, thereby forming the figure writing layer 104. Thereafter, the data recording layer 102 and the figure writing layer 104 were affixed to each other via a spacer layer 103, thus constructing the optical disk 201. The phase change layer 207 had a melting point Tr=560° C. and a crystallization temperature Tcr=220° C.; the phase change layer 208 had a melting point Tg=580° C. and a crystallization temperature Tcg=240° C.; and the phase change layer 209 had a melting point Tb=600° C. and a crystallization temperature Tcb=260° C. When the difference between the refractive index of the protection substrate 105 and that of the protection layer 217 is sufficiently large, their interface functions as a reflective layer and therefore the back-side reflective layer 218 can be dispensed with.

Figure 2:
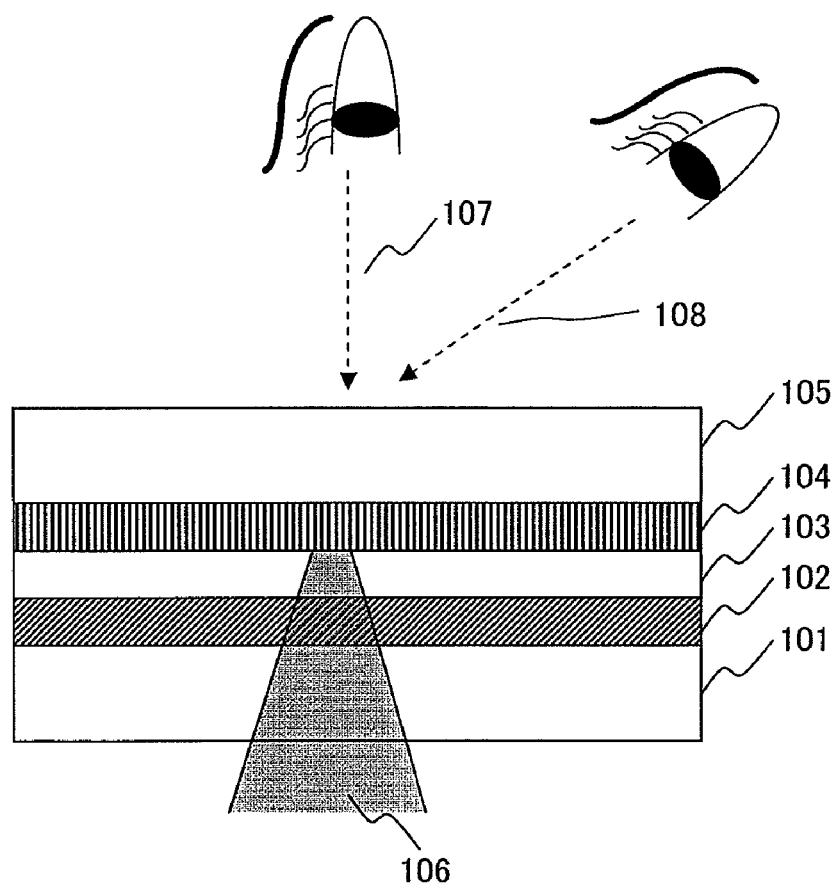
FIG. 2 illustrates a method of writing a visible figure in an optical disk and a method of viewing the written figure.

FIG. 2 illustrates a visible figure writing method of the present embodiment and a method of viewing a written figure.

When writing visible information, laser light 106 is focused on the figure writing layer 104 via the substrate 101, data recording layer 102, and spacer layer 103, and then a write start position is tracked. The figure writing layer is protected by the protection substrate 105. Then, in accordance with a write pattern based on write information, the laser power is modulated so as to crystallize the amorphous state and alter the atomic arrangement, thereby causing a reflectivity change in the figure writing layer 104. The written figure or signs are visible to the naked eye through the protection substrate 105 from various directions 107 and 108. In this case, the figure or signs exhibit the same color whether looked at from a direction 107 perpendicular to the writing surface or from an inclined angle 108. Therefore, not just the figure or signs but the color information can be utilized for disk identification purposes. Since the irradiation of the figure writing layer with laser light is conducted through the data recording layer, it is not necessary to flip the optical disk between data recording and the writing of visible information.

With regard to the temperature at which a change can be caused in the three phase change layers 207, 208, and 209, there is a relationship among the melting points Tr, Tg, and Tb such that Tr<Tg<Tb, and a relationship among the crystallization temperatures Tcr, Tcg, and Tcb such that Tcr<Tcg<Tcb. Specifically, the closer the phase change layer is to the incident-side reflective layer 213, the lower the melting point and the crystallization temperature become; and the closer the phase change layer is to the back-side reflective layer 218, the higher the melting point and the crystallization temperature become. For this reason, it becomes possible to control each phase change layer to an amorphous state or a crystal state with regard to individual element regions of the figure writing layer by controlling the laser power and irradiation time of irradiation of the figure writing layer 104 via the data recording layer 102. In the present medium, it is also possible to erase the written figure or signs by rendering the crystal state back to an amorphous state using high laser power irradiation.

In the optical disk shown in FIG. 1 in which writing has been conducted in the figure writing layer 104, a desired phase change layer 207, 208, or 209 is changed from amorphous state to crystal state 210, 211, or 212 on an element region by element region basis by controlling laser power and irradiation time. For example, irradiation energy was controlled such that region A of the figure writing layer 104 had a temperature higher than Tcr and lower than Tcg, whereby the phase change layer 207 having a low crystallization temperature Tr alone was changed into crystal state, while the phase change layers 208 and 209 remained in amorphous state. In region B, irradiation energy was controlled such that the temperature became higher than Tcg and lower than Tcb, whereby the phase change layers 207 and 208 changed to crystal state. In region C, irradiation energy was controlled such that the temperature became higher than Tcb, whereby all three of the phase change layers 207, 208, and 209 changed from amorphous state to crystal state.

As a result, in region A, the white light that becomes incident on the protection substrate 105 side is subject to strong interference between the back-side reflective layer 218 and the phase change layer 207, such that absorption occurs at shorter wavelengths and reflection occurs at longer wavelengths. The reflection spectrum has a peak at around 800 nm, so that red is exhibited. When the optical path length DL (nm) between layers that strongly interfere with each other is located near the peak wavelength; namely, when the relationship between a mean refractive index Na of the layers and the distance D (nm) is expressed by equation (2), red or a color close to red is exhibited. The optical path length DL (nm) is calculated by the equation (1):

$$DL = 2 \times Na \times D \tag{1}$$

In the example of the present medium with the color red, $DLr=2\times2.3\times(80+15+5+10+40)=690$.

$$650 \leq DLr \leq 800 \tag{2}$$

In region B, white light that becomes incident on the protection substrate 105 side is subject to a strong interference between the back-side reflective layer 218 and the phase change layer 208; absorption occurs at shorter wavelengths at around 350 nm and at longer wavelengths at around 700 nm; and reflection occurs at an intermediate wavelength region near 450 to 500 nm. The reflection spectrum has a reflection peak at around 480 nm, so that green is exhibited. In the case of equation (3), green or a color close to green is exhibited. In the present example with the color green, $DLg=2\times2.3\times(80+15+5)=460$.

$$450 \leq DLg \leq 550 \tag{3}$$

In region C, white light that becomes incident on the protection substrate 105 side is subject to strong interference between the back-side reflective layer 218 and the phase change layer 209; absorption occurs at longer wavelength, and the reflection spectrum has a reflection peak at around 410 nm, so that blue is exhibited. In the case of equation (4), blue or a color close to blue is exhibited. In the present example of the medium with the color blue, $DLb=2\times2.2\times(80)=352$.

$$350 \leq DLg \leq 430 \tag{4}$$

In region D, all three layers remain in amorphous state. Although there is weak interference, there is no difference in either absorption or reflection in virtually the entire visible light wavelengths. As a result, the reflection spectrum does not have its peak at any specific wavelength, so that black is exhibited.

Figure 3:
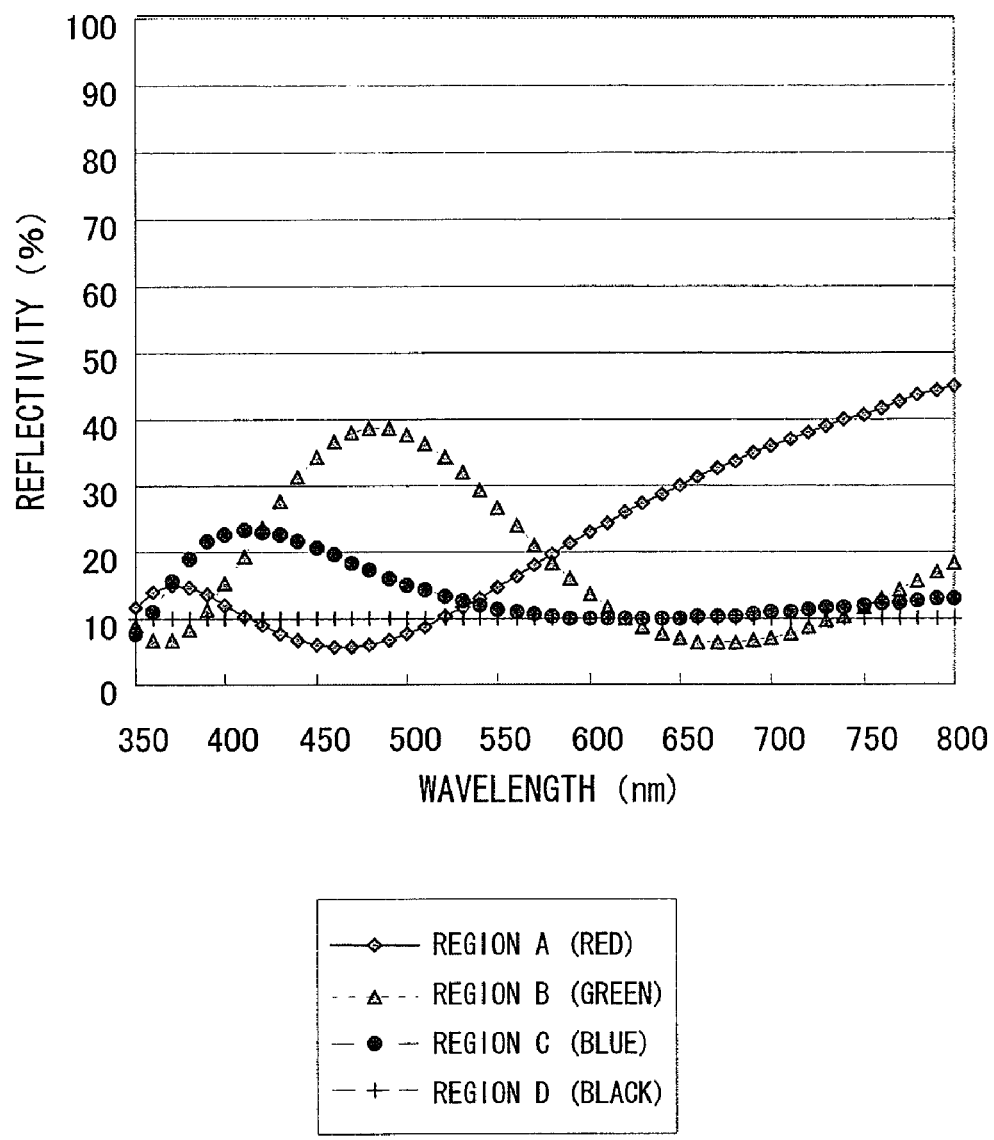
FIG. 3 shows the optical characteristics of each region of a medium in which a figure was written.

FIG. 3 shows the optical characteristics in each region. It can be seen that the color differs depending on the wavelength at which the reflectivity peak appears. The condition regarding optical path length DL in the above equations (1) to (4) take into consideration the influence of strongly interfering layers alone. However, the reflection spectrum of the writing layer after writing contains not only the influence of the strongly interfering layer but also the influence of other interference, so that the condition regarding the optical path length DL and the wavelength range become shifted. Regarding the relationship between peak wavelength and color in the reflection spectrum, blue was enhanced when the peak wavelength is 400 nm or longer and 520 nm or shorter; green was enhanced when the peak wavelength was 480 nm or longer and 550 nm or shorter; red was enhanced when the peak wavelength was 700 nm or longer. Thus, it was learned that, by changing the optical condition of a desired number of layers among the layers in which atomic arrangement is changed by energy irradiation, it becomes possible to write a figure or characters in multiple colors.

Figure 4:
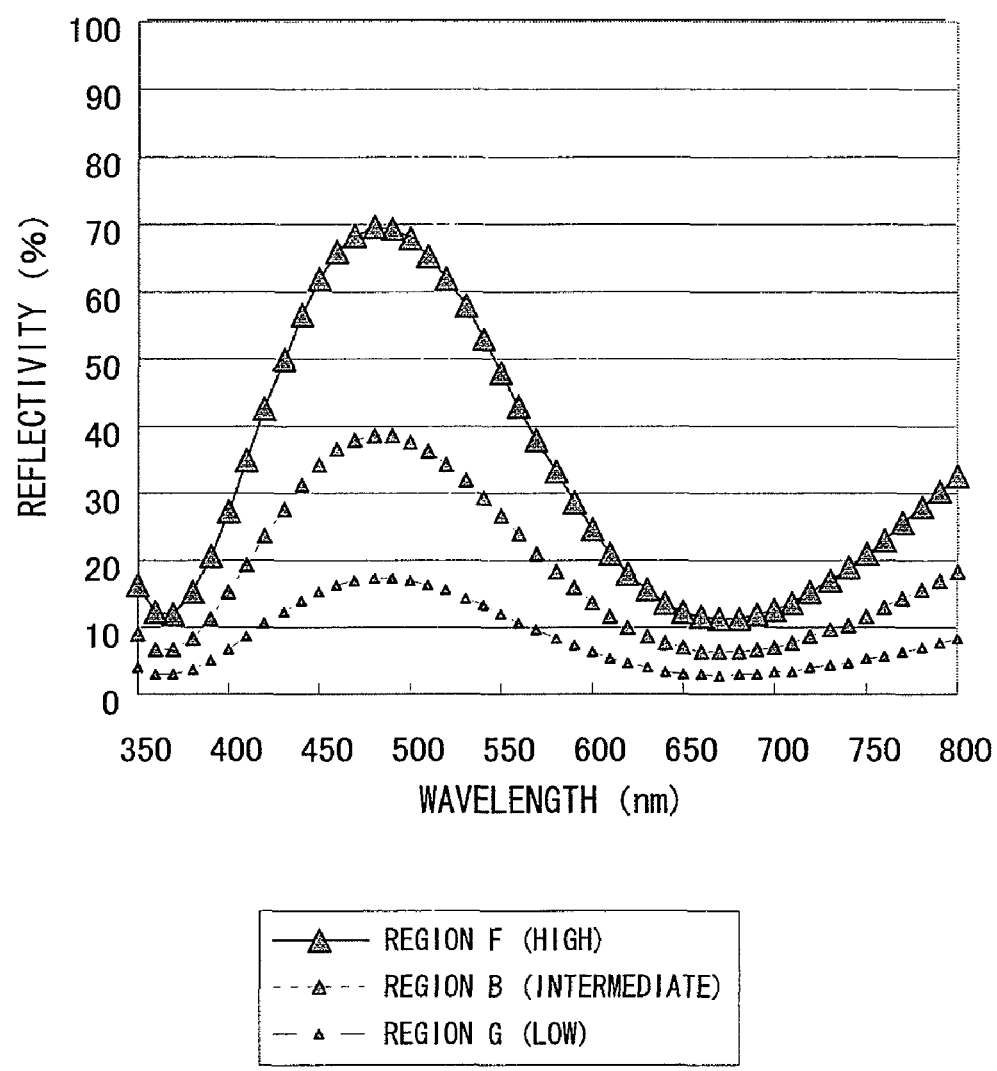
FIG. 4 shows the optical characteristics of regions of a figure-written medium having different color saturations.

Further, as shown in FIG. 4, the higher the peak reflectivity and/or the mean reflectivity, the brighter the color appears; the lower the peak reflectivity and/or the mean reflectivity, the less bright the color appears. In particular, the color appears very bright when the peak reflectivity is 50% or more and dull when it is 30% or less.

Figure 5:
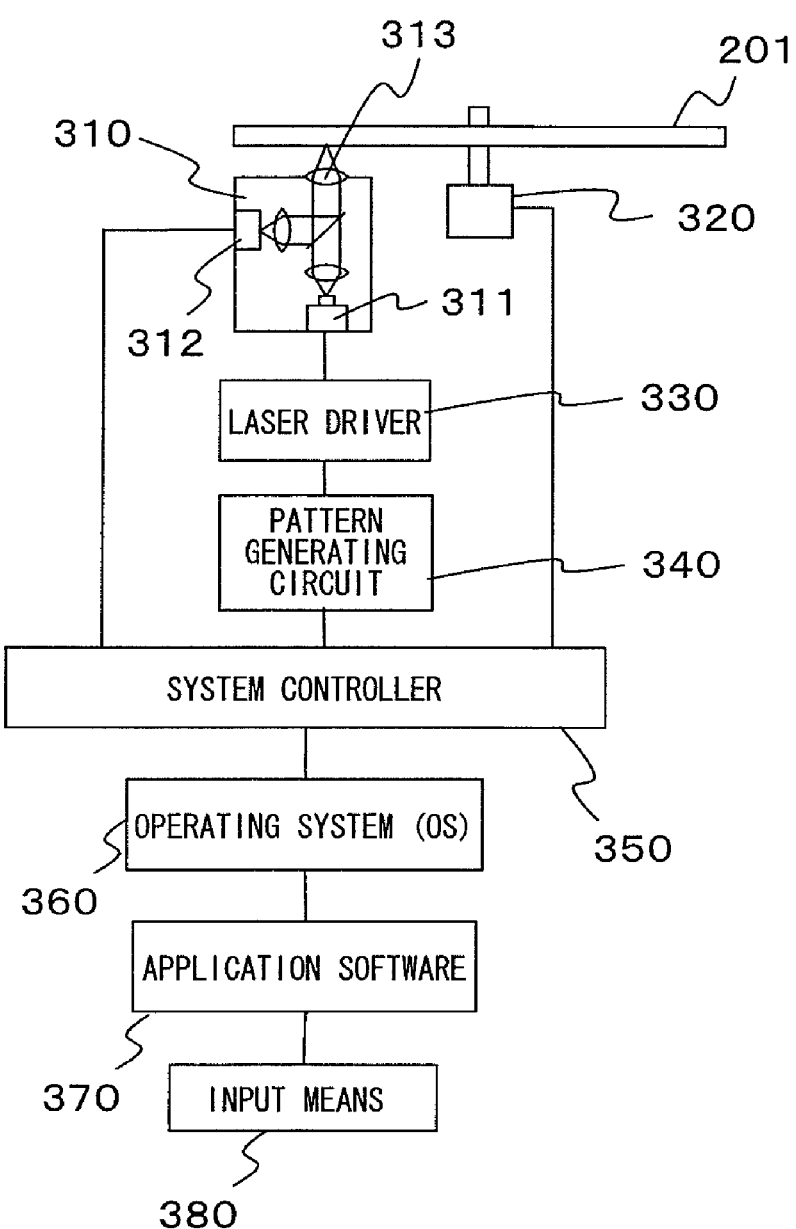
FIG. 5 shows a schematic block diagram of an optical disk apparatus having a figure writing function.

FIG. 5 shows a schematic block diagram of an example of an optical disk apparatus having the figure writing function according to the present invention. For the convenience of explanation, the apparatus is described as having an optical disk 201 mounted thereon. The optical disk 201, which is indispensable for the writing of information, may be removed from or attached to the optical disk apparatus as needed.

The optical disk apparatus includes: an optical head 310 having a semiconductor laser 311, a photodetector 312, and an objective lens 313, the head being movable in the radial direction of the optical disk 201; a motor 320 for rotating the optical disk 201; a laser driver 330 for driving the semiconductor laser 311 in accordance with a pattern generated by a pattern generating circuit 340; a system controller 350 for controlling the apparatus as a whole; and input means 380 via which an operating system 360, application software 370, data recording information, and figure write information are entered. While not shown in the drawing, the optical head 310 also includes actuators for controlling the position of the objective lens 313 along the optical axis and in a direction perpendicular to the optical axis for autofocusing and tracking purposes. There is also provided a servo controller that produces an actuator drive signal based on a detection signal from the optical head 310.

With the optical disk thus mounted on the optical disk apparatus having the figure writing function, an instruction for figure writing and information about the figure to be written are entered from a host controller, such as the application software 370, the operating system 360, or the like, via the input means 380. The system controller 350 then positions the focus of the laser light emitted by the optical head 310 on an appropriate position on the figure writing layer of the optical disk 201. The system controller 350 then drives the laser driver 330 in accordance with the write pattern so as to write the figure.

Figure 6:
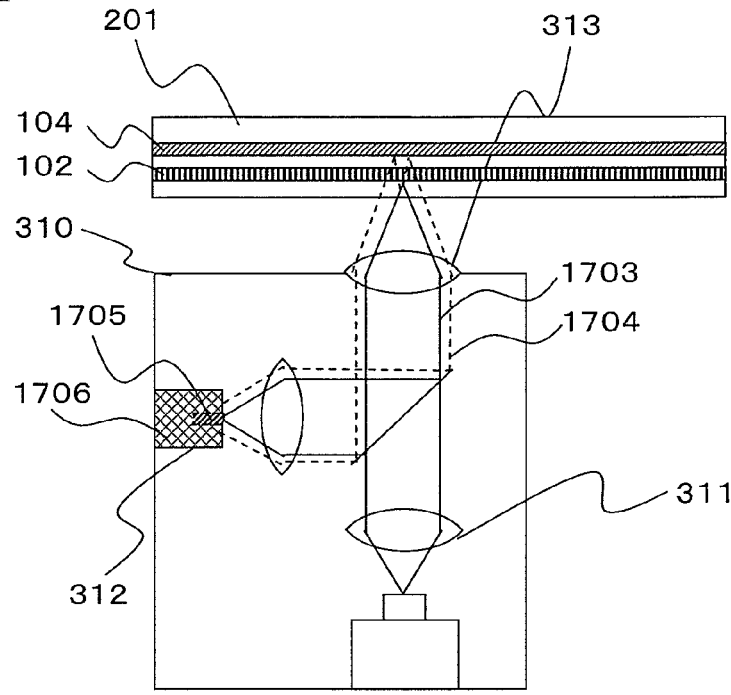
FIGS. 6A to 6C schematically show the head portion of the writing apparatus.
Figure 6:
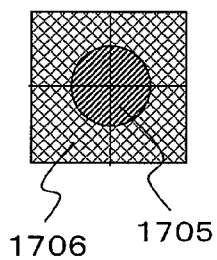
Figure 6:
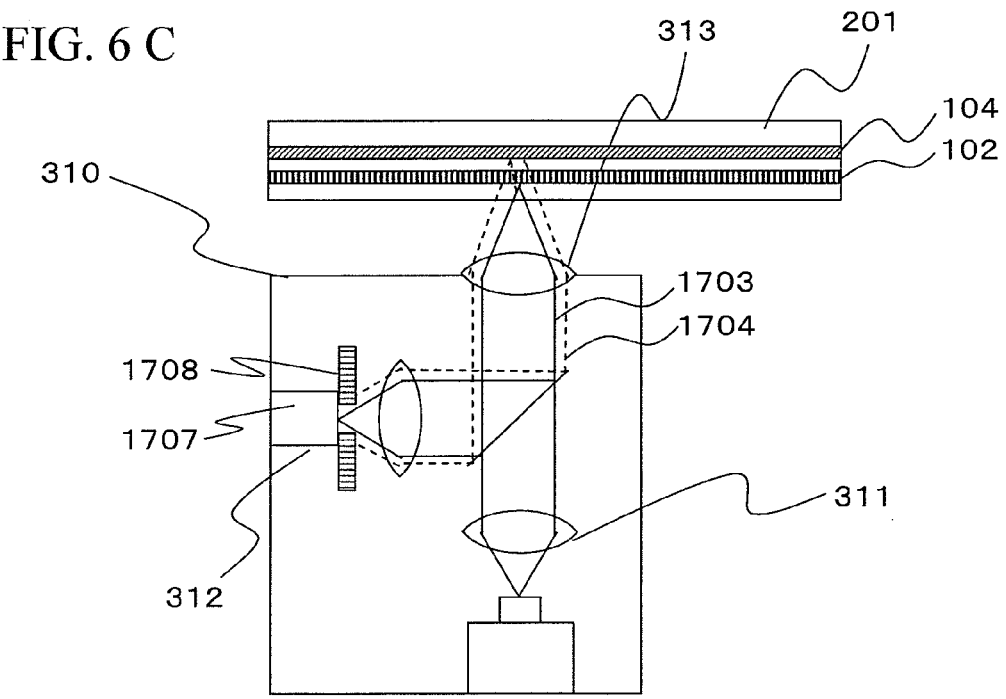

FIGS. 6A to 6C schematically show the head portion of the present apparatus. The medium 201 has formed therein the data recording layer 102 for the recording of data and the figure writing layer 104 for the writing of visual information, such as a figure. A solid line 1703 shows the path of light being focused on the data recording layer 102 for the recording/reproduction of data. A broken line 1704 shows the path of light that leaks from the figure writing layer 104.

To allow for stable data reproduction from the data recording layer after writing characters or pictures or the like in the figure writing layer 104, the head portion of the optical disk apparatus of the invention is equipped with a function for eliminating the light that leaks from the figure writing layer 104 during the recording or reproduction of data. FIG. 6A and FIG. 6B show one such example. As shown in FIG. 6A, the detection plane of a detector is divided into center portions 1705 and peripheral portions 1706. Based on signals obtained from the peripheral portions 1706, the amount of leak is calculated and is subtracted from the signal received by the center portions, thereby eliminating the influence of the leakage light from the figure writing layer 104. More specifically, when the signals obtained from the center portions 1705 are Ia, Ib, Ic, and Id, and the signals obtained from the peripheral portions 1706 are Ie, If, Ig, and Ih, signal I is calculated by equation (5):

$$I = (Ia+Ib+Ic+Id) - \alpha \times (Ie+If+Ig+Ih) \tag{5}$$

where $\alpha$ is a leakage coefficient. By selecting the leakage coefficient such that improved signal quality is achieved, the influence of leakage can be eliminated.

In the foregoing example, the detection plane was divided into eight sections for the sake of simplicity. Preferably, however, each divided section is further divided into four sections for more accurate elimination because the leakage pattern from the figure writing region in the medium of the invention differs depending on regions A to D and there are four such patterns.

FIG. 6C shows another example of the mechanism for eliminating the leakage of light from the figure writing layer 104. In this example, a movable aperture limiting mechanism 1708 is provided before the detector 312. When the aperture is not limited, the signal 1703 from the data layer 102 carries a leakage component 1704 from the figure writing layer 104; when the aperture is limited, the leakage component 1704 is limited. Based on the difference in the amount of signal between when the aperture is not limited and when it is limited, aperture conditions are selected such that the influence of leakage into the detector can be reduced or eliminated. Preferably, the aperture patterns are provided in three or more levels depending on the degree of leakage, so that the influence of leakage light can be more accurately eliminated.

Figure 7:
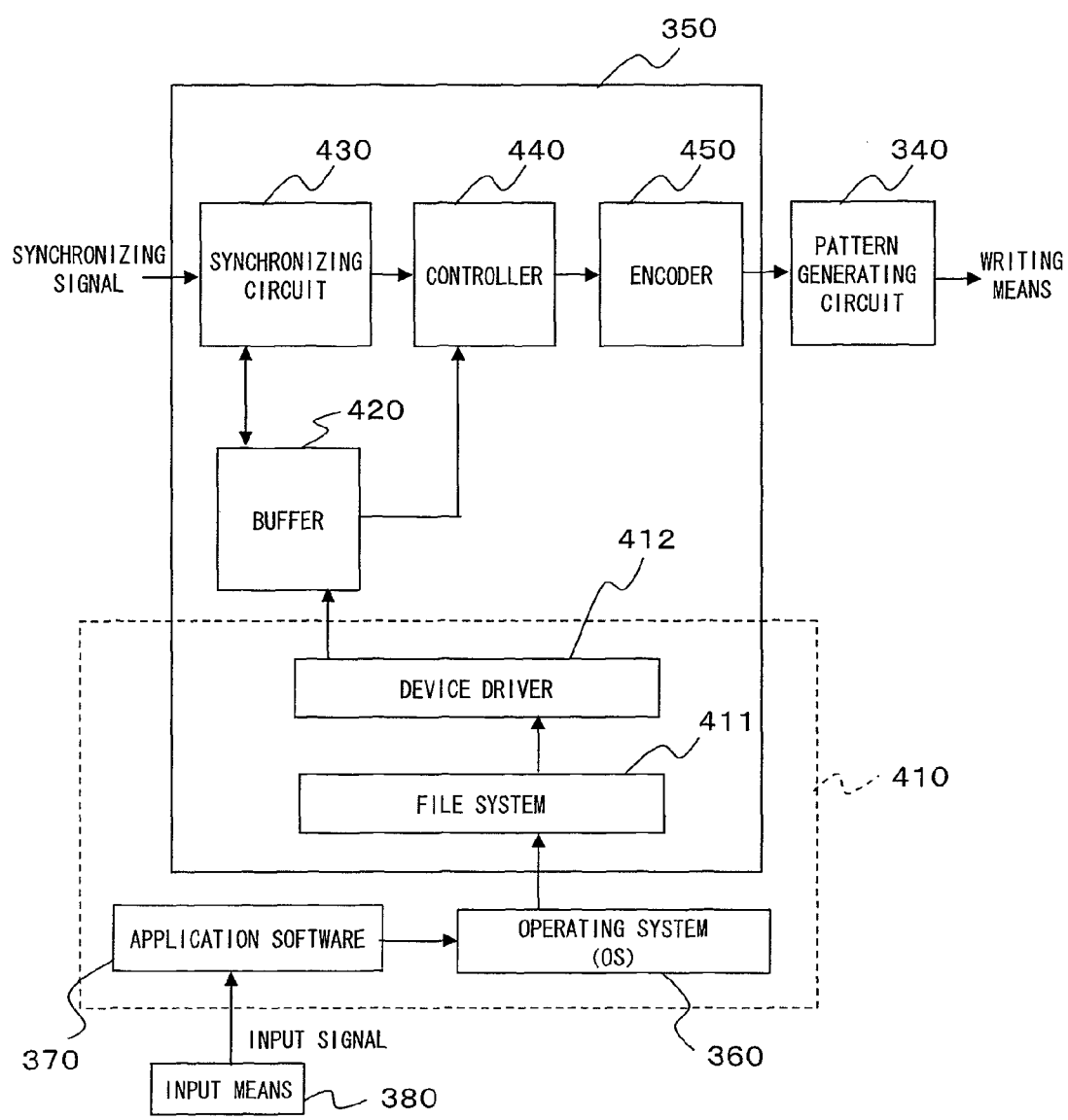
FIG. 7 shows a diagram of a system controller.

FIG. 7 shows the system controller 350 which controls the apparatus as a whole. An input signal from the input means 380 is delivered via application software 370 and operating system 360 to a file system 411 in the system controller 350, from which it is further delivered via a device driver 412 to a buffer 420 where it is stored. The functions of the portions enclosed within a broken line 410 in FIG. 7, i.e., application software 370, operating system 360, file system, and device driver 412, are realized by software. Such software differs from software in conventional optical disk apparatuses that only perform data recording and reproduction in that a "function for managing the data recording area and the figure writing area by distinguishing the former from the latter" is added. The "function for managing the data recording area and the figure writing area by distinguishing the former from the latter" is provided by the file system 411 or the device driver 412.

The optical disk apparatus of the invention having the figure writing function has a corresponding table of sector arrangement information and figure writing coordinates for each type of format of the figure writing layer/writing region of the disk. Alternatively, in the optical disk apparatus, format information is created upon initial writing.

Figure 8:
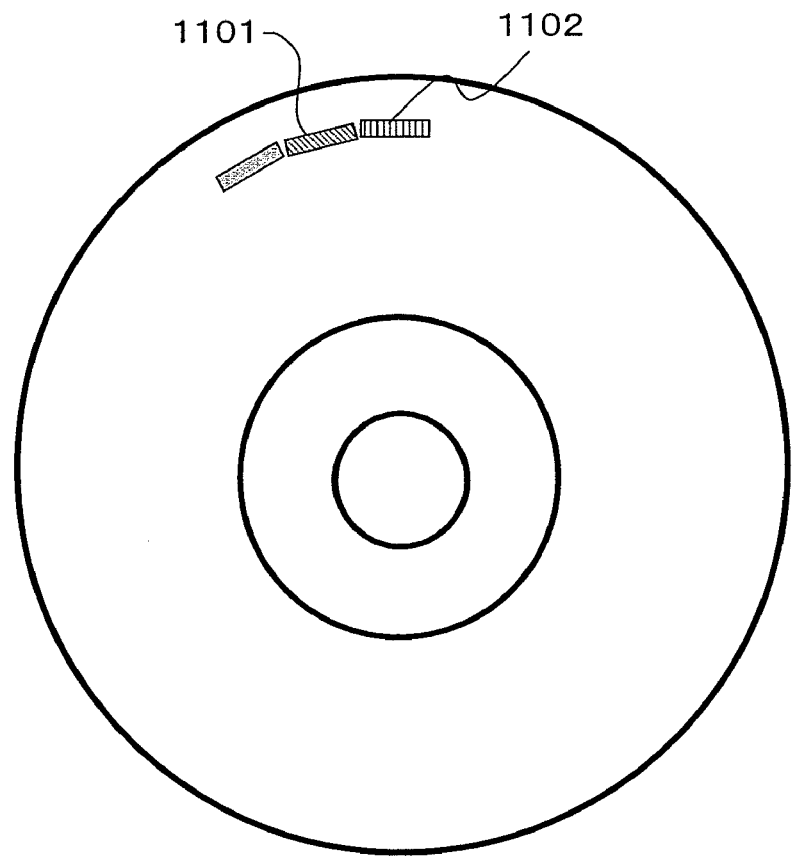
FIG. 8 illustrates an example of the relationship between the arrangement of sectors and figure writing coordinates.
Figure 8:
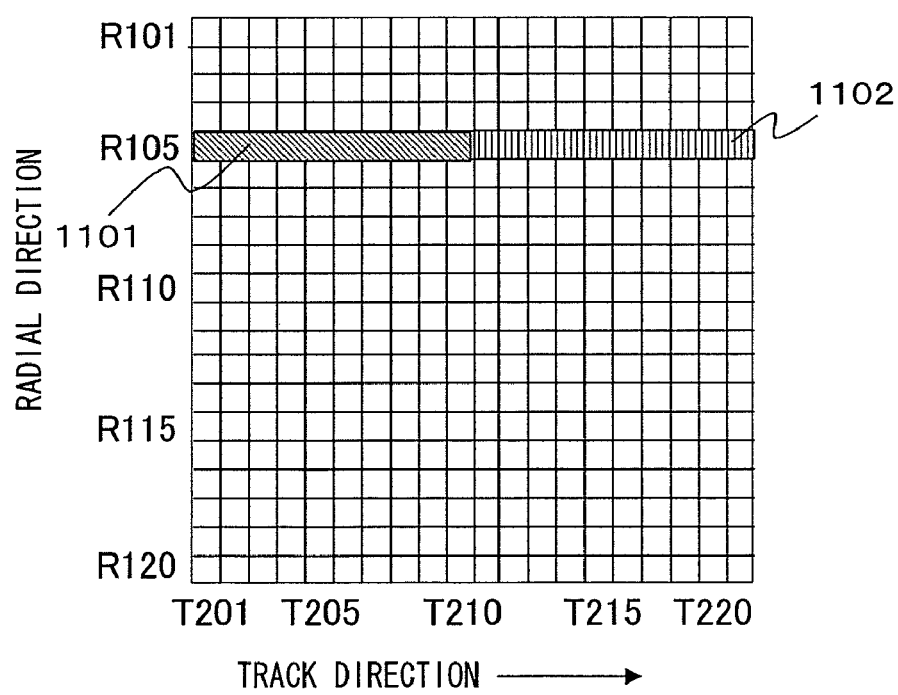

FIG. 8 shows an example of the relationship between the arrangement of sectors and figure writing coordinates. In this example, a sector 1101 corresponds to coordinates (R105, T201) to (R105, T210), and a sector 1102 corresponds to coordinates (R105, T211) to (R105, T220). A figure based on figure writing data is expanded on these figure writing coordinates and associated with sectors on the optical disk, on the basis of which a laser drive pattern is generated.

Figure 9:
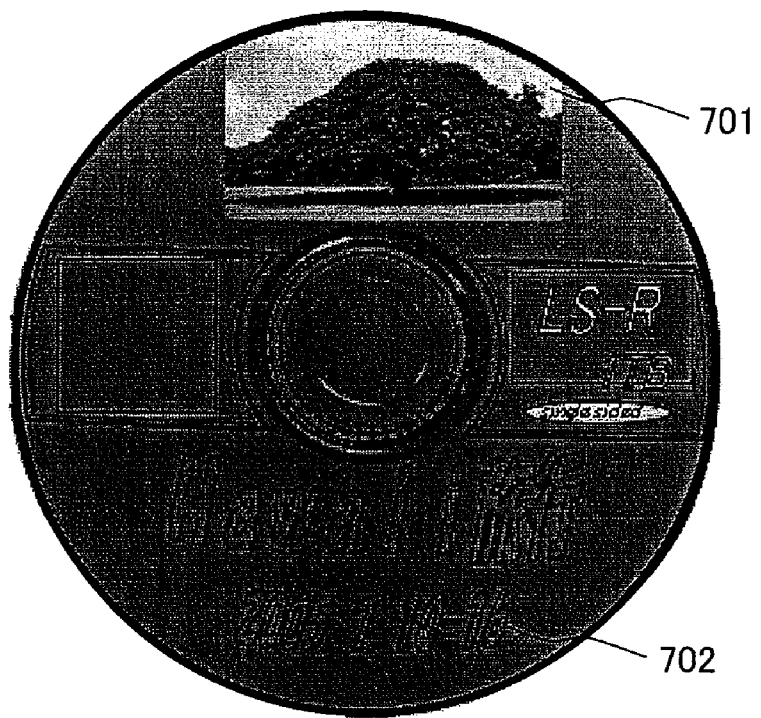
FIG. 9 shows an example of a disk with a written figure.

In the following, an example of the process of writing characters, a figure, or a picture on the recording surface of an optical disk is described. In the present example, data, such as image data, and characters entered via the keyboard or the like as an index of the data are written on the optical disk in a visible manner. The index data may be entered by the user; it may be the data attached to recorded data such as an image; or it may be determined by the system. If the image data represents photographs, for example, the index may include the title of each image, date/time, a part of a representative photograph, and the like. For example, as shown in FIG. 9, it is possible to write a title 702 together with an image 701 in the figure writing layer as visible characters, followed by or prior to the recording of the relevant image data in the data recording layer. Alternatively, it is also possible to simply write a title or an image selected by the user, instead of such index.

Figure 10:
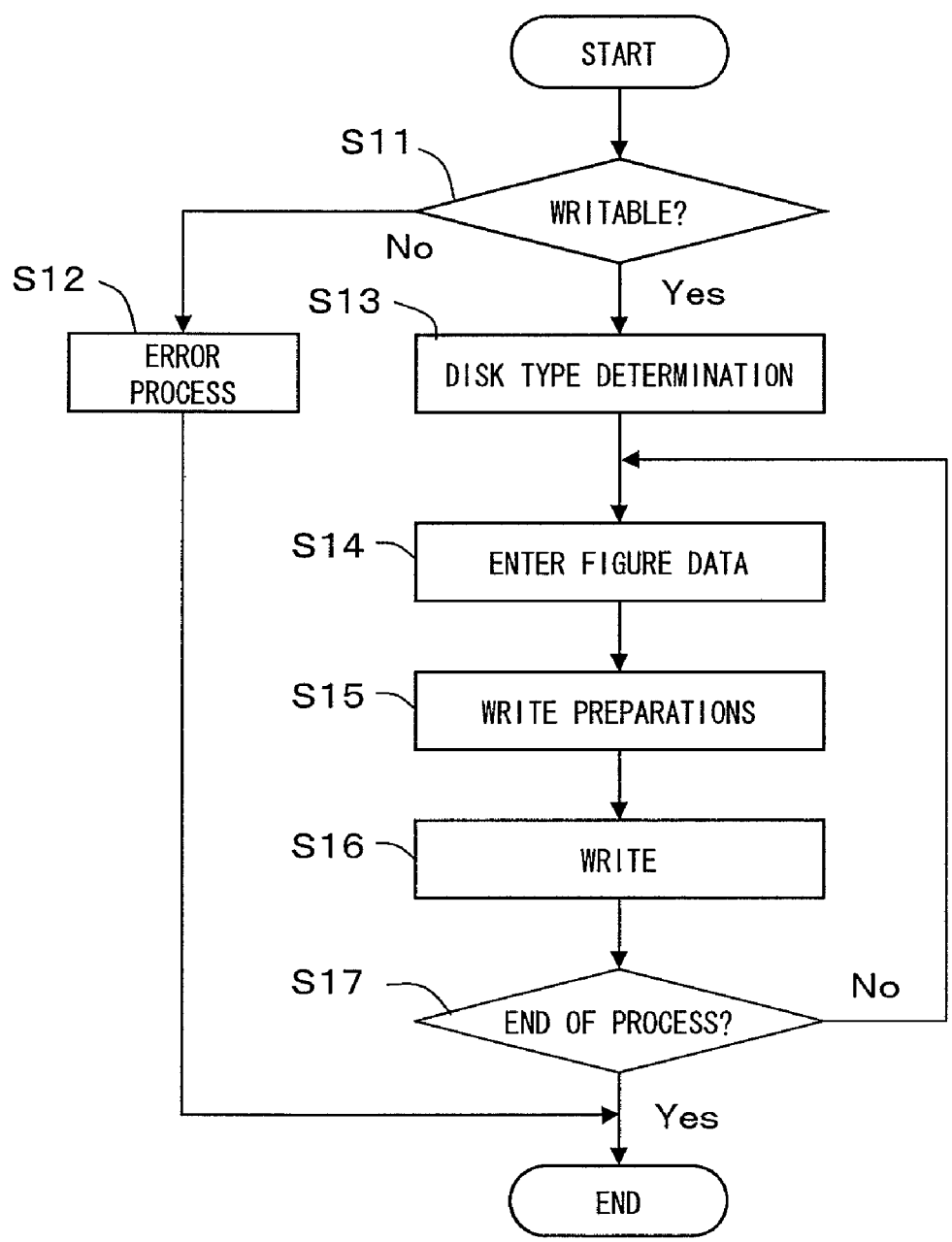
FIG. 10 shows a flow chart of a process of writing according to the invention.

FIG. 10 shows a flow chart of an example of the process of writing a visible figure on the optical disk. After the disk is inserted and the apparatus is turned on, a process is initiated to determine whether or not the disk is adapted to figure writing (step 11). If the disk is a ROM disk or otherwise not compatible with the specification of the apparatus, it is determined that the disk is not capable of writing, and an error process is carried out (step 12). If the disk is adapted to the writing of a figure, the type of the disk is determined (step 13). In the disk type determination process, the figure writing coordinates and the sector arrangements on the optical disk are associated with each other, as described with reference to FIG. 8. After figure writing data is entered (step 14), a write preparation step is carried out (step 15) and then the figure data is written (step 16). At the end of the figure writing process, if there is further input data, the routine returns from step 17 to step 14 and the process is repeated. If there is no further input data, the process ends.

Figure 11:
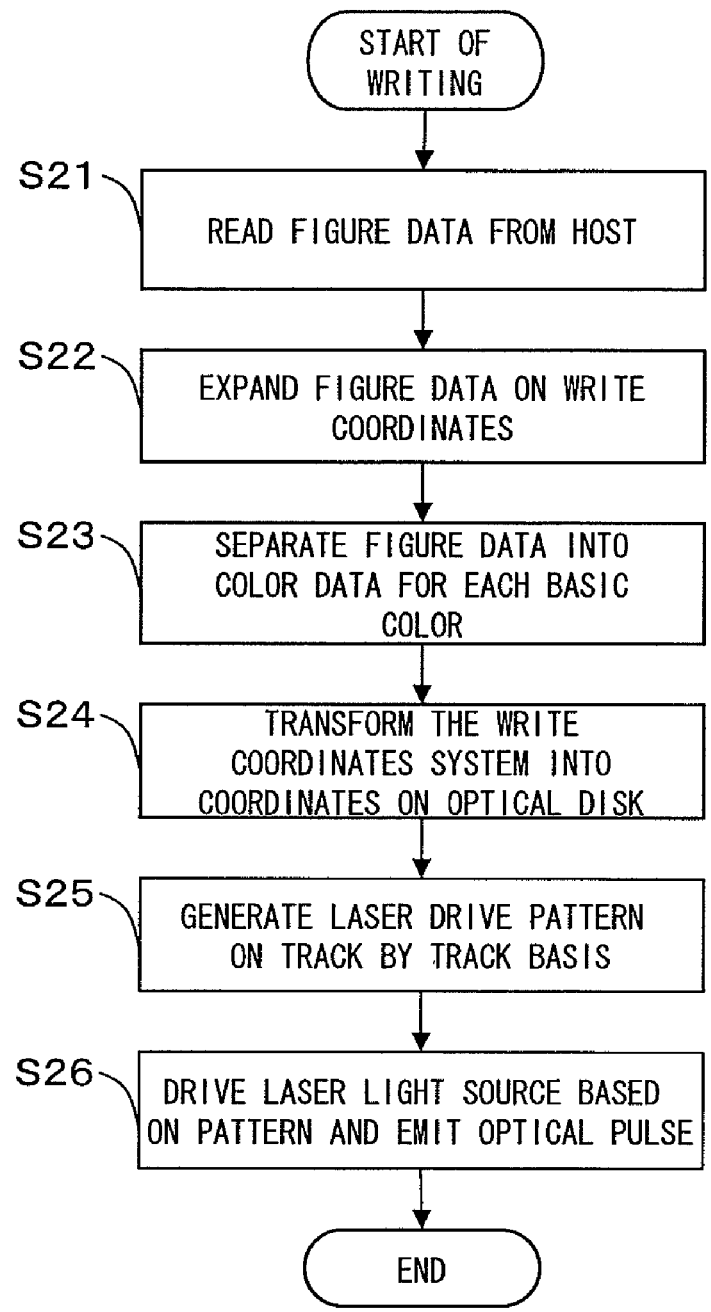
FIG. 11 shows a flow chart of the writing step.

With reference to FIG. 11, the writing process is described in greater detail. Upon starting the writing process, the figure data for figure writing is read from a host (step 21). The thus read figure data is then expanded on the writing coordinates system (step 22), and then the figure data is separated into color data for each basic color (step 23). The writing coordinates system is then transformed into the coordinates on the optical disk (step 24). Based on the shape data and color data expanded on the coordinates on the disk, a laser drive pattern for each track is generated (step 25). The laser drive patterns are generated such that they have different laser irradiation energy for each basic color and such that the irradiated area varies depending on color saturation and hue. Further, the laser light source is driven in accordance with the laser drive pattern so as to irradiate the figure writing layer of the optical disk with an optical pulse (step 26), thereby writing a visible figure on the optical disk. Among those steps, step 22 and step 23 may be switched and yet the writing process can be carried out; however, the order shown in FIG. 11 allows the process to be carried out faster.

The figure writing preparation process and the writing process are carried out under the control of the system controller 350. The figure writing preparation process involves moving the optical head to a figure writing position on the optical disk, encoding the written content and the written color tone, and transmitting the encoded information to the writing means. As shown in FIG. 7, upon sending of an input signal containing the written content, address information about the location where the writing is to begin, and the like, to the system controller 350, such information is stored in the buffer 420 and then sent to a controller 440. The controller 440 synchronizes the input signal from the buffer 420 with a synchronizing signal from a synchronization circuit 430, and then sends the synchronized signal to the encoder 450.

Figure 12:
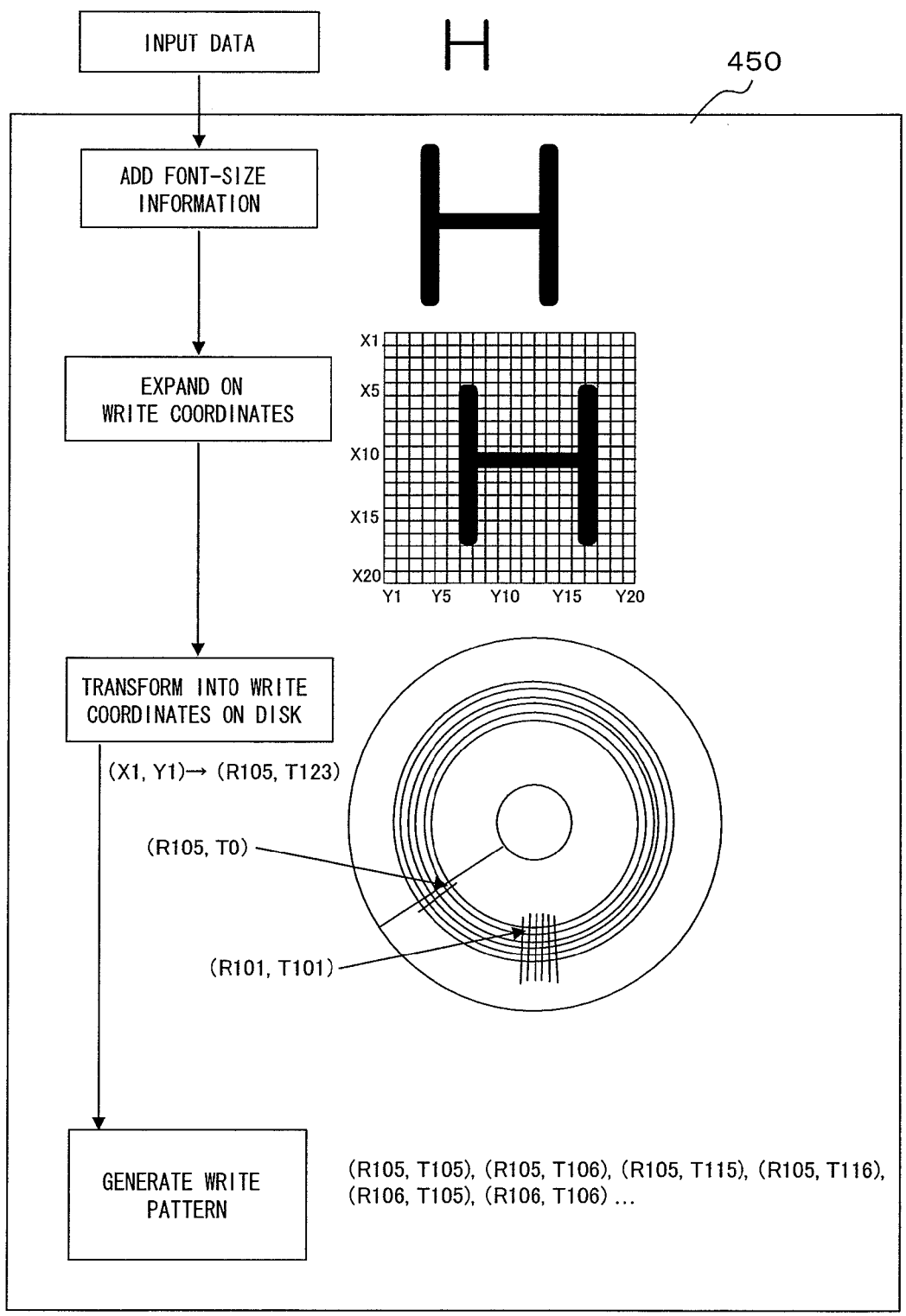
FIG. 12 shows a process performed by an encoder in detail.

FIG. 12 illustrates the process in the encoder 450 in detail. The figure writing data (character "H" in the illustrated example) entered via the keyboard is combined with font-size information and then expanded on the figure writing coordinates, thus converting the figure writing data into actual figure writing coordinates set on the disk. For example, the character "H" is expanded between 1 to 20 on the X coordinate axis and between 1 to 20 on the Y coordinate axis, and the writing takes place in an area of (X5,Y5), (X5,Y6), and (X5,Y7) therein. Based on the correspondence table of such write information and the sector and figure writing coordinates as shown in FIG. 8, a figure writing pattern is generated. In the illustrated example, in order to cause a write start point (R101, T101) of the figure writing coordinates on the disk to correspond to (X1,Y1) of the figure writing coordinates, (X5,Y5), (X5,Y6), and (X5, Y7) are converted to (R105, T105), (R105, T106), and (R105, T107), respectively.

Figure 13:
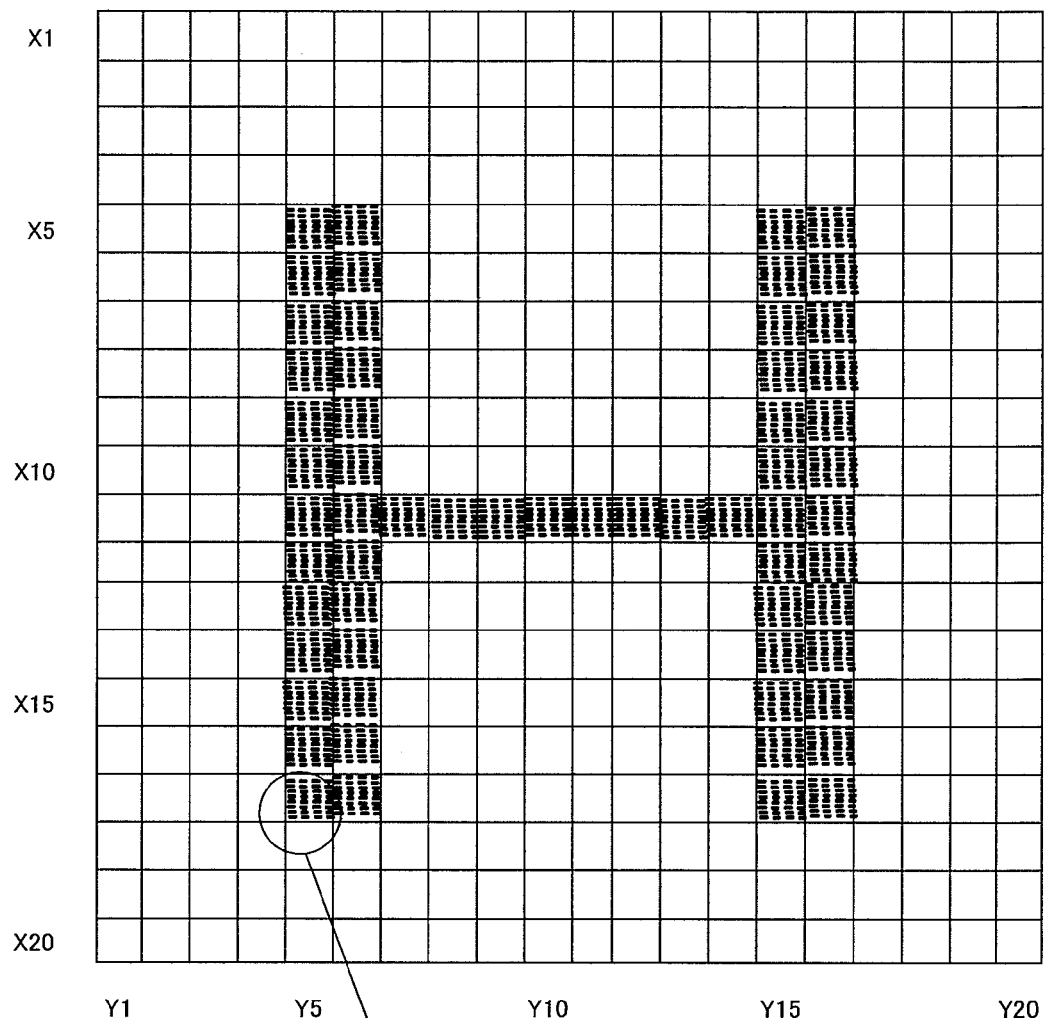
FIG. 13 shows figure writing coordinates and an enlarged view of a character expanded thereon.
Figure 13:
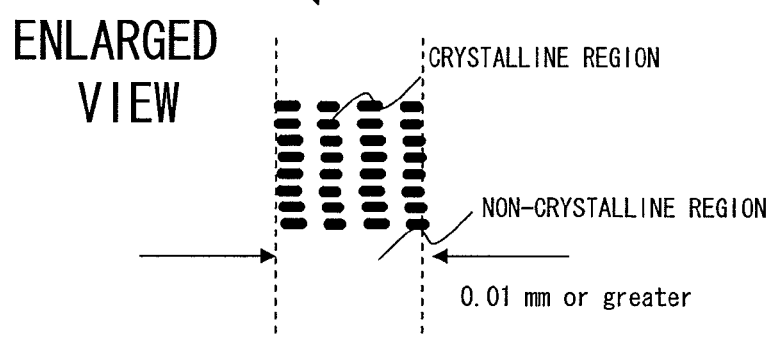

FIG. 13 shows an enlarged view of the figure writing coordinates and the character "H" expanded thereon. A region (X17, Y5) which is converted into (R117, T105) is composed of a plurality of crystal regions, as shown enlarged at the bottom of FIG. 13. In the present example, the region is formed of eight tracks for simplicity's sake. However, for an area represented by one coordinate point on the figure writing coordinates to be actually visible, it needs to have an area of approximately 0.01 mm×0.01 mm or more. Therefore, if the optical disk has a track width of approximately 0.6 μm, one coordinate point needs to be associated with about 17 tracks or more with a length of 0.01 mm or more. The shape of such region measuring 0.01 mm×0.01 mm or greater may be square, rectangular, trapezoidal, hexagonal, triangular, or the like. In order for a written figure to be visible, it needs to occupy a region having a width of about 0.01 mm×0.01 mm or more and to have a reflectivity change of 5% or more with respect to the surrounding regions caused therein with a visible wavelength (350 to 800 nm). The reflectivity changes herein refers to the mean reflectivity within the region. A written figure was difficult to see both when the area of the region in which a change in reflectivity was caused was small and when the amount of reflectivity change was small.

Figure 14:
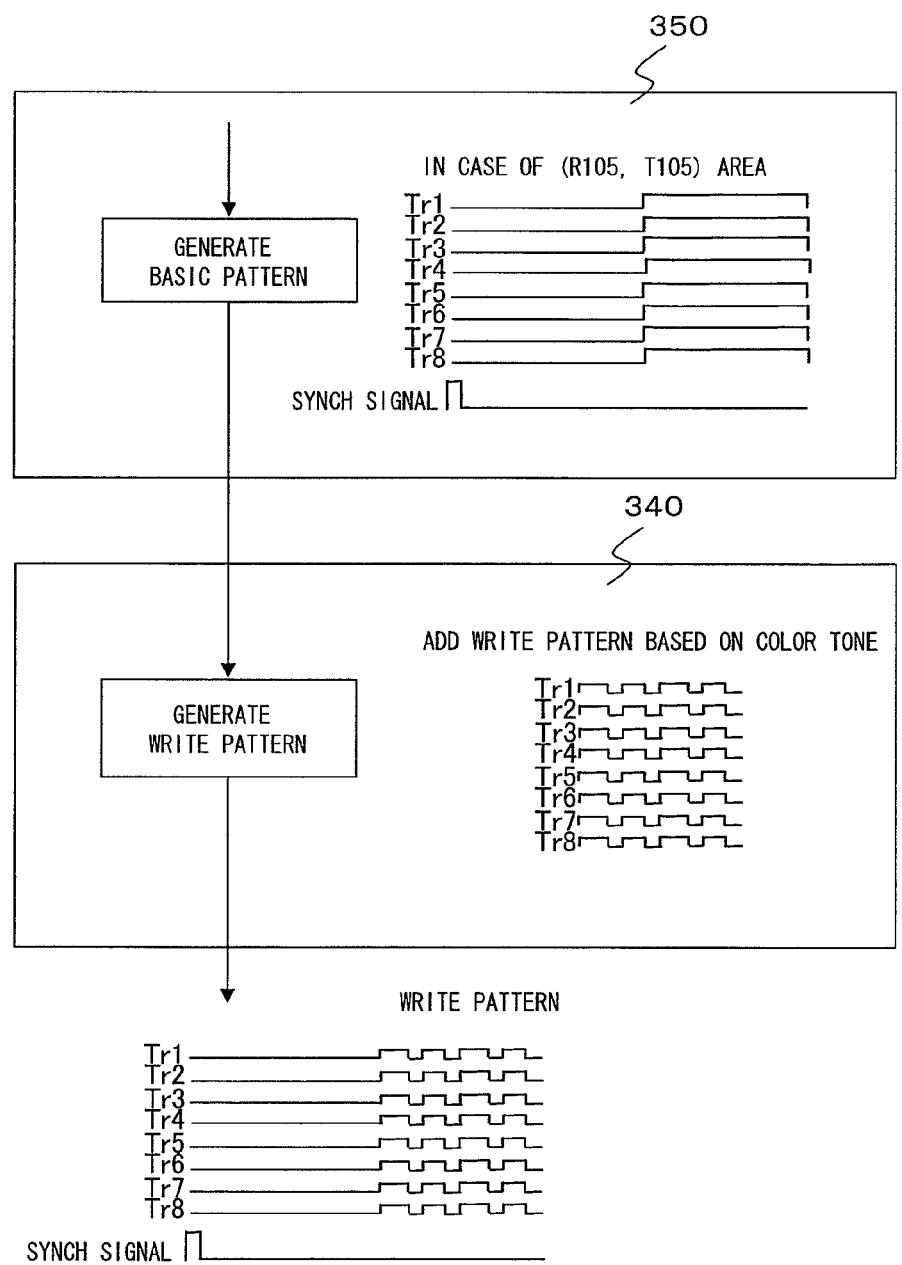
FIG. 14 illustrates how a write waveform is generated.

FIG. 14 illustrates how a write waveform is generated. In the encoder 450 in the system controller 350, by referring to the correspondence table of sectors and figure writing coordinates, and based on the figure expanded on the figure writing coordinates, a basic write pattern is formed that is timed with a synchronizing signal for each track and in the order of recording. In FIG. 14, a write pattern corresponding to the figure writing coordinates (R105, T105) on the disk is shown as an example. The write pattern is combined with a write pattern associated with hue in the pattern generating circuit 340 so as to generate a final write waveform, which is stored in the buffer. The hue will be described later.

With reference to FIG. 5, the laser driver 330 is driven with the write waveform outputted by the pattern generating circuit 340, whereby the semiconductor laser 311 emits light and the optical disk 201 is irradiated with laser light from the optical head 310 that is temporally modulated in accordance with the information to be written, thereby writing a figure consisting of characters or pictures on the optical disk 201. The drive current of the semiconductor laser 311 is caused to change in synchronism with a synchronizing signal for the peripheral direction of the optical head 310 or with a write clock basic wave.

Figure 15:
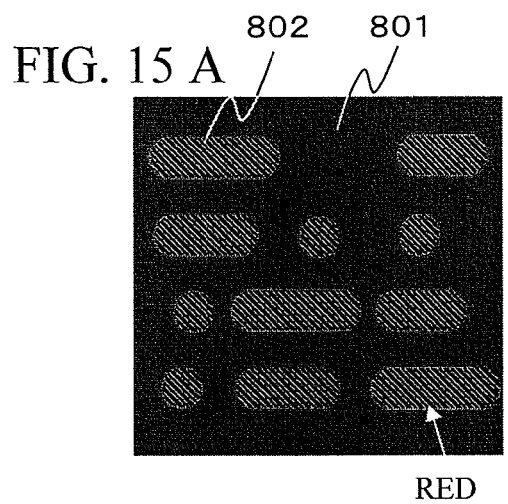
FIGS. 15A to 15F show enlarged views of the inside of an element for the description of hue.
Figure 15:
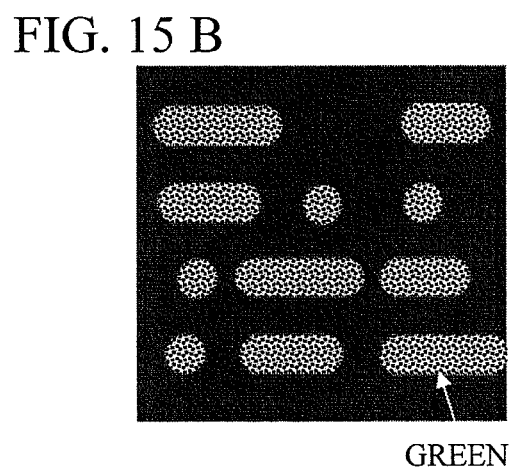
Figure 15:
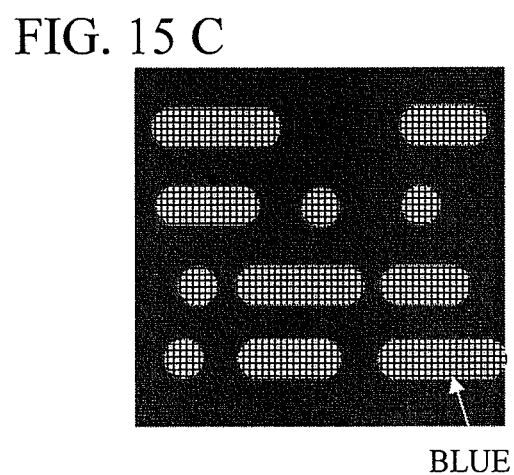
Figure 15:
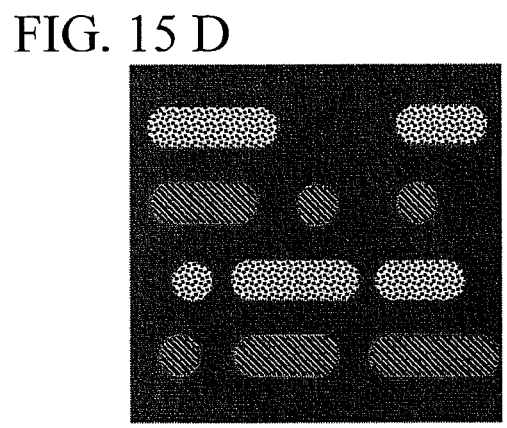
Figure 15:
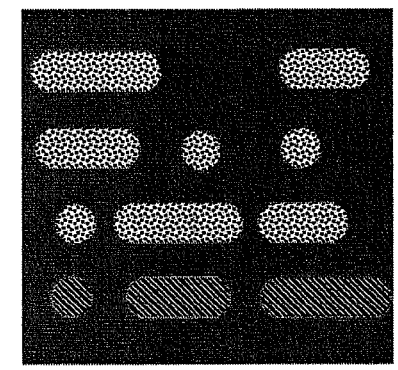
Figure 15:
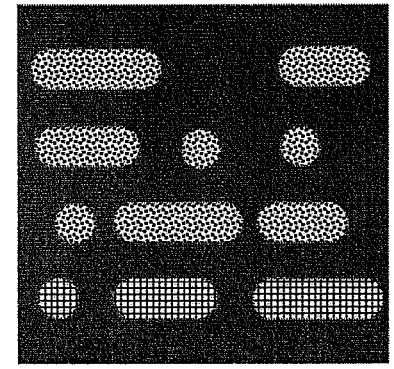
Figure 16:
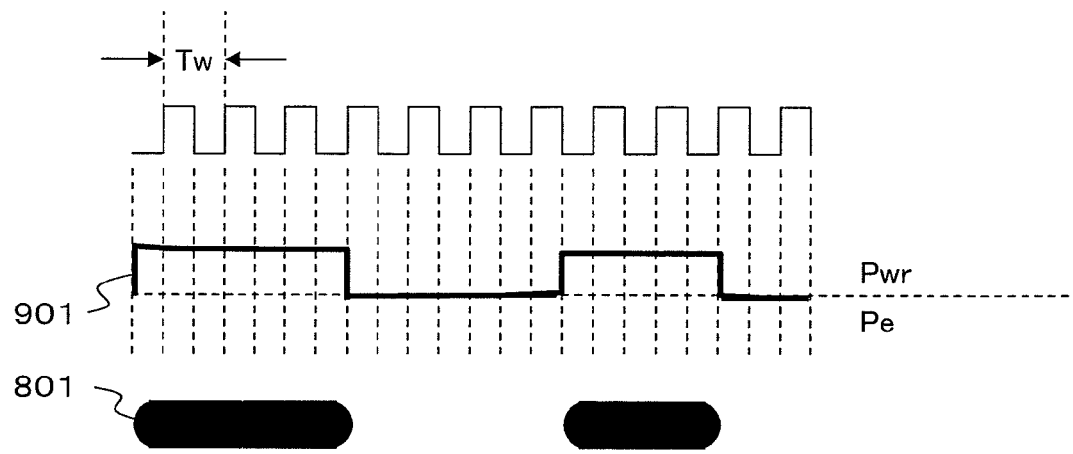
FIGS. 16A to 16C show examples of write waveform.
Figure 16:
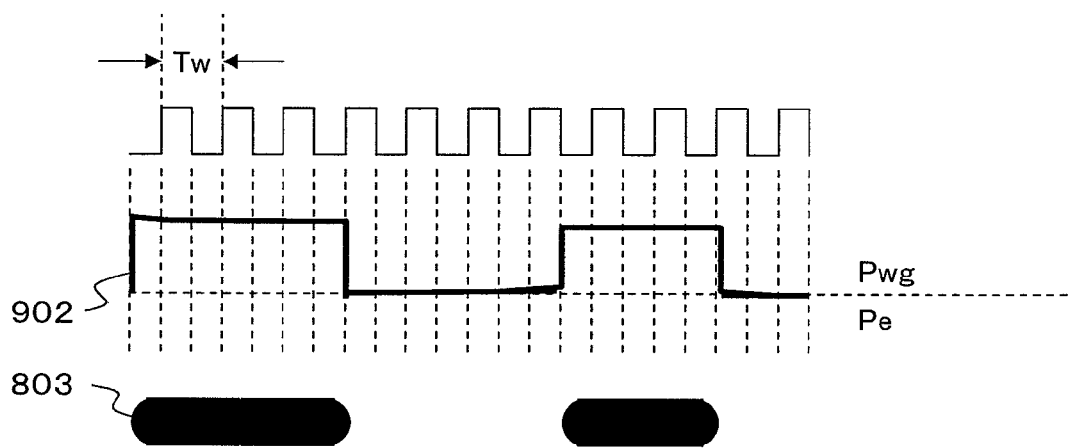
Figure 16:
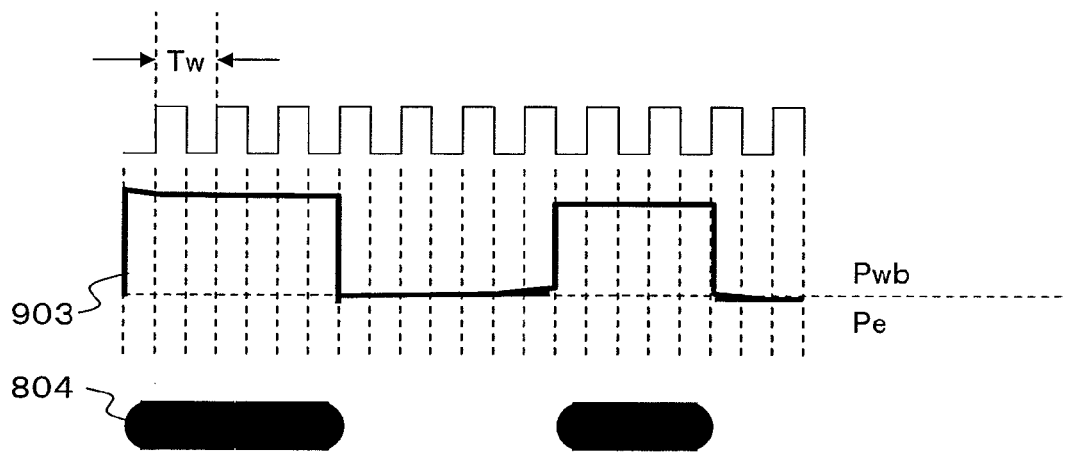

The hue is described in the following. FIGS. 15A to 15F depict the crystallization (802) of a crystalline recording layer 801 of an optical disk caused by modulating laser light in one of the elements shown in FIG. 1. FIGS. 16A to 16C show the power levels (recording waveforms) corresponding to FIGS. 15A to 15C. As shown, the power level of the irradiation laser light increases in the order of FIGS. 16A, 16B, and 16C. By thus irradiating the recording layer of the recording layer of the optical disk with high-power laser of different levels and crystallizing the recording layer, a plurality of crystallization regions having different colors are visibly formed, as shown in FIGS. 15A to 15C. FIG. 15D shows the crystallization of the recording layer caused by alternating the power levels (recording waveforms) of FIGS. 16B and 16A for each recording row. In this case, it is impossible for the naked eye to recognize the distribution of such fine colors, so that the region appears in an intermediate color of the two colors. The same applies to FIGS. 15E and 15F; namely, these are examples in which intermediate colors are produced by using different power levels for different recording rows. Since the hue of a color is substantially proportional to the area, and since the region of FIG. 15F a larger area for green, it exhibits an intermediate color closer to green than red.

Thus, the present invention allows a figure or a sign to be written in a plurality of colors. Because of the addition of the color information, the ease of recognition has greatly improved as compared with cases of a single color. The present invention also provides the additional advantage of allowing a code for a color bar code to be written. By further increasing the number of the phase change layers in the figure writing layer so as to enable the use of colors between the three colors, it becomes possible to combine the colors in a subtle manner and thereby to provide more beautiful appearance; this, however, would make the configuration of the medium and the process of energy control during writing more complicated. By combining any two of those colors, the configuration can be simplified, although it does not provide a full-color appearance.

In the foregoing examples, a polycarbonate substrate has been used that has a tracking groove formed directly on its surface. A "substrate having a tracking groove" refers to a substrate that has a groove on the entire surface of the substrate or on a part of the surface thereof, the groove having a depth of $\lambda/15n$ (where n is the refractive index of the substrate material) or greater. Such groove may be formed either continuously to make a complete circle, or it may be divided along the circle. It has been learned that the preferable depth of the groove is about $\lambda/12n$ from the viewpoint of a tracking/noise balance. The width of the groove may vary from one location to another. The substrate may be adapted to a format such that recording/reproduction can be carried out in both groove and land portions; a format such that recording can take place in either one of such portions; or a sample servo format wherein tracking servo marks are provided intermittently.

When the recording/reproduction light is made incident on the laminated substrate side, the thickness of the laminated substrate may be reduced to approximately 0.1 mm and NA of the objective lens may be increased to 0.85, whereby the track pitch can be made approximately three quarters.

Embodiment 2

In the following, another embodiment of the invention in which a visible figure is written on an optical disk having a voltage-layer-selection-type figure writing layer.

Figure 17A:
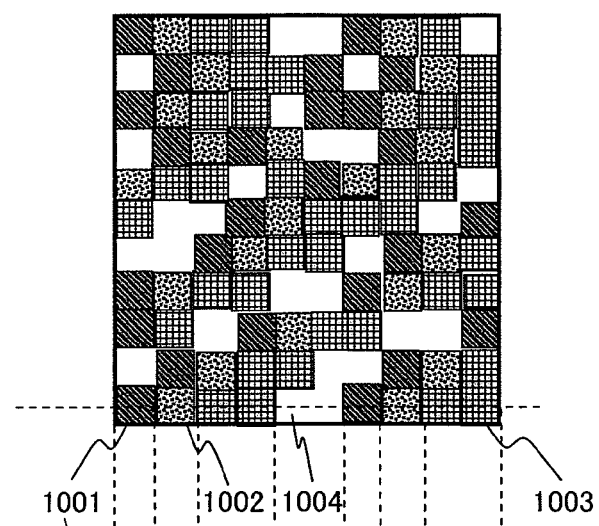
FIGS. 17A to 17B show an example a written optical disk having a voltage-layer-selection-type figure writing layer.
Figure 17B:
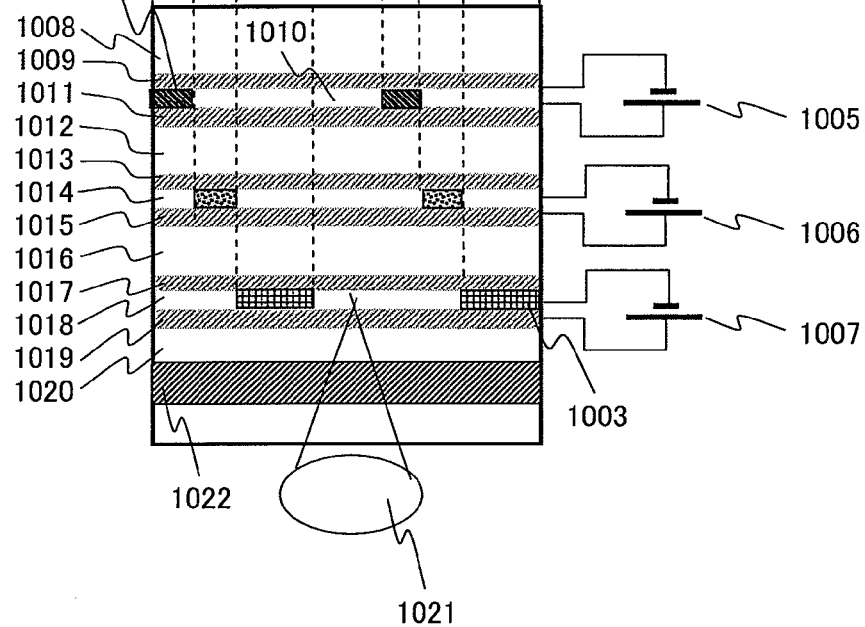

FIG. 17B shows a schematic cross section of the figure writing layer portion of the optical disk used in the present embodiment. The figure writing layer includes three kinds of electrochromic layers 1010, 1014, and 1018 having different reflectivity peak wavelengths, and transparent electrode layers 1009, 1011, 1013, 1015, 1017, and 1019 for applying voltage to the electrochromic layers. While transparent insulating layers 1012 and 1016 are provided between electrodes, such insulating layers may be omitted and instead the electrodes 1011 and 1013 and the electrodes 1015 and 1017 may be made common. In addition, the present medium includes a data recording layer 1022, a spacer layer 1020, and a substrate 1008.

In the present example, the electrochromic layer 1010 consists of a $Cu-V_2O_5$ layer; the electrochromic layer 1014 consists of an $Au-V_2O_5$ layer; and the electrochromic layer 1014 consists of $WO_3$ layer. The electrochromic layers 1010, 1014, and 1018 are transparent when no voltage is applied; upon application of voltage, they appear red, green, and blue, respectively, due to the difference in peak wavelength being reflected in reflectivity and transmittance.

In the electrochromic layers, since they have a large transmittance, the peak of a composed spectrum consisting of the reflectivity component R and the transmittance component T appears differently. While Embodiment 1 has been described in terms of reflectivity with reference to FIGS. 3 and 4, when this is substituted with a composed spectrum of reflectivity and transmittance, the relationship between peak wavelength and color is the same.

When writing, voltage applying mechanisms 1005, 1006, and 1007 apply voltages optimized to cause a reflectivity change between electrode layers so as to cause a desired electrochromic layer to be colored, and then the electrochromic layer is irradiated with laser 1021. The optimum voltage refers to a voltage in a range such that the colored and decolored states are reversibly produced when the application and termination of voltage is repeated. In the present example, such optimum voltage range was 1.5 to 6V.

Thus, when writing a figure, a voltage is applied to a selected electrochromic layer by a voltage applying mechanism, and energy irradiation is conducted after an increase in reflectivity. In this way, an uncolored region is formed on the figure writing layer. By repeating the process of applying a voltage to each of the three kinds of electrochromic layers 1010, 1014, and 1018 sequentially and then writing, figure writing for a plurality of colors can be conducted. By thus applying voltages simultaneously, three colored regions were visually identified.

Figure 18:
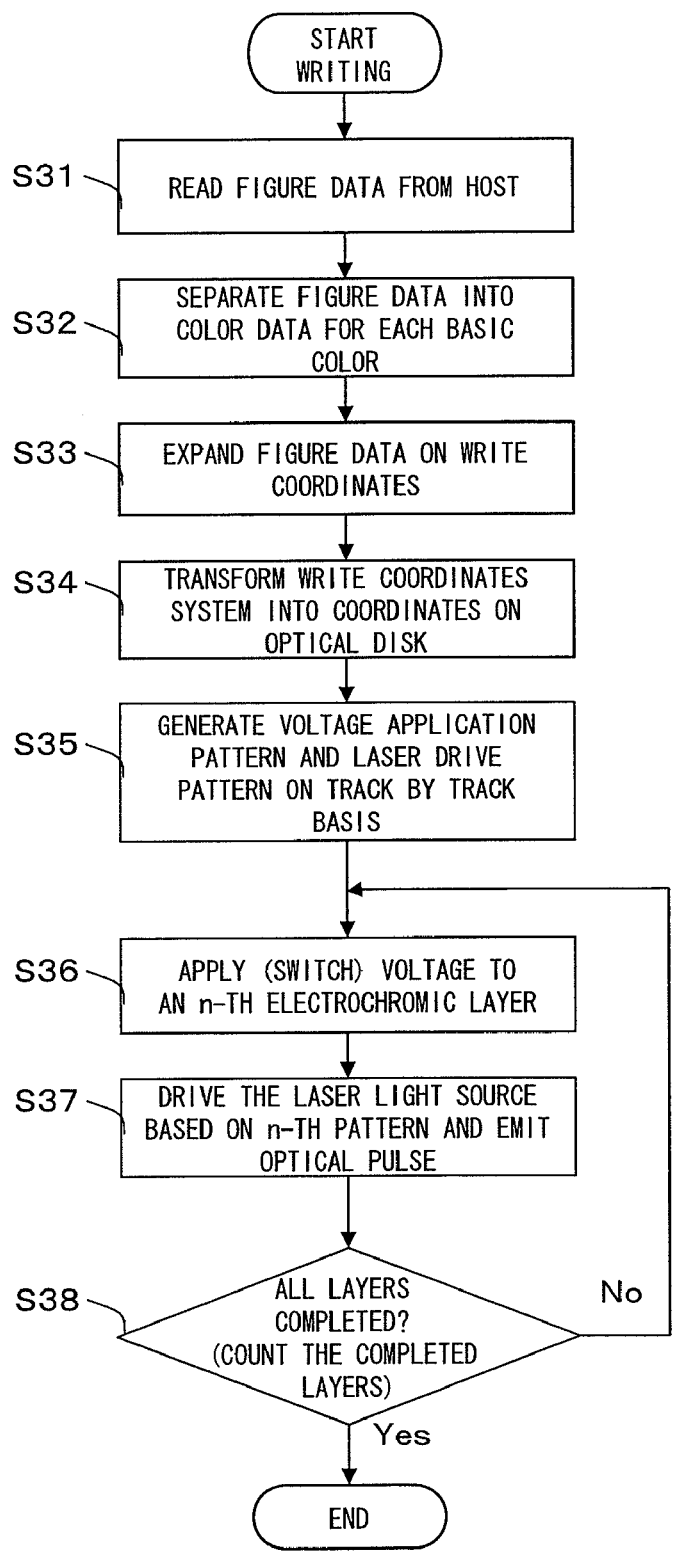
FIG. 18 shows a flow chart of a procedure of figure writing.

FIG. 18 shows a flow chart of the procedure of figure writing. Prior to writing a visible figure on a figure writing layer having an electrochromic layer, figure data for figure writing is read from the host (step 31). Then, the figure data that has been read is separated into shape data and color data for each basic color (step 32). The figure data that has been read is then expanded on the writing coordinates system (step 33), and the writing coordinates system is transformed into coordinates on the optical disk (step 34). Based on the shape data and color data expanded on the coordinates on the disk, a laser drive pattern is generated for each track (step 35). Specifically, when there are three electrochromic layers, a laser drive pattern for the first electrochromic layer is generated on a track by track basis based on the shape data allocated to the first electrochromic layer. A laser drive pattern for the second electrochromic layer is generated on a track by track basis based on the shape data allocated to the second electrochromic layer. A laser drive pattern for the third electrochromic layer is generated on a track by track basis based on the shape data allocated to the third electrochromic layer. The laser drive patterns thus generated are such that they have different laser irradiation energy for each basic color and the irradiated area differs depending on the color saturation or hue of the color.

Thereafter, voltage is applied to the n-th layer electrochromic layer, where n is 1 (step 36), and then the laser light source is driven in accordance with the track-by-track laser drive pattern for the n-th electrochromic layer, whereby the figure writing layer of the optical disk is irradiated with an optical pulse (step 37). When there are three electrochromic layers, n is 1, 2, or 3, and step 36 and step 37 are repeated so as to write each of the layers. In step 38, the number of the layers that have been written is counted; when all of the layers have been written, the process ends. In the voltage applying step in step 36, if voltage is being applied to one layer, the application of voltage to that layer is terminated and then voltage is applied to a relevant layer; alternatively, a reverse voltage is applied to the layer to which voltage is being applied, the voltage application is terminated, and then voltage is applied to the relevant layer, thereby switching the layers.

FIG. 17A shows an example of writing in an optical disk having a voltage-layer-selection-type figure writing layer. An electrochromic layer 1010 that becomes colored in red upon voltage application was irradiated with laser except for regions 1001. Similarly, an electrochromic layer 1014 that becomes colored in green upon voltage application was irradiated with laser except for regions 1002; an electrochromic layer 1018 that becomes colored in blue upon voltage application was irradiated with laser except for regions 1003.

The figure writing layer of this optical disk is uncolored in the absence of voltage application. When voltage is applied by the voltage applying mechanisms 1005, 1006, and 1007 to the three electrochromic layers 1010, 1014, and 1018 simultaneously, a visible, multicolor figure appears. Namely, the regions 1001 in the electrochromic layer 1010 that are not laser-irradiated become colored in red; the regions 1002 in the electrochromic layer 1014 that are not laser-irradiated become colored in green; and the regions 1003 in the electrochromic layer 1018 that are not laser-irradiated become colored in blue. The regions 1004 in the three electrochromic layers 1010, 1014, and 1018 layered in the thickness direction that were laser-irradiated remain uncolored when voltage is applied thereto. As a result, a visible, multicolor figure appears that is drawn with the three colors of dots.

It is also possible, using an optical disk having a voltage-layer-selection-type figure writing layer, to cause characters or a figure written in the figure writing layer to become visible without voltage application. For example, after a visible, multicolor figure has been written as described above, a voltage higher than an optimum voltage by 2V or more is applied continuously for five minutes or longer. This causes an irreversible change in the electrochromic layers 1010, 1014, and 1018, so that the colored state can remain in the colored region even after voltage is terminated. Thus, the multicolor figure written in the figure writing layer can be seen without applying voltage to the electrochromic layers 1010, 1014, and 1018.

In addition to $WO_3$, $Au$—$V_2O_5$, and $Cu$—$V_2O_5$, examples of the electrochromic material include: Prussian blue ($K_xFe^{II}_yFe^{III}_z(CN)_6$), which is a cyanide of iron; $MoO_3$; $Nb_2O_5$; $V_2O_5$; $TiO_2$; NiOOH; CoOOH; $Rh_2O_3$; $IrO_x$ (x is a positive number smaller than 1); ZrNCl; InN; $SnN_x$ (x is a positive number smaller than 1); $MnO_x$ (x is a positive number smaller than 2); and a $WO_3$—$MoO_3$ complex (mixed) thin layer. Au, Ag, Cu, or the like may be added to these materials. Other examples include IrSnOx, NiOOH, CoOOH, tungsten oxalate complex, organic electrochromic material, and mixed inorganic-organic electrochromic material. The material should be selected depending on the basic color. Such materials can be used as a protection layer.

The writing method, medium configuration and material, information recording and reproduction method and apparatus, and the like, that were not particularly mentioned in the foregoing embodiment are the same as those of Embodiment 1.

Embodiment 3

In the following, another embodiment of the invention is described, in which the number of electrodes in an optical disk having a voltage-layer-selection-type figure writing layer is reduced.

Figure 19:
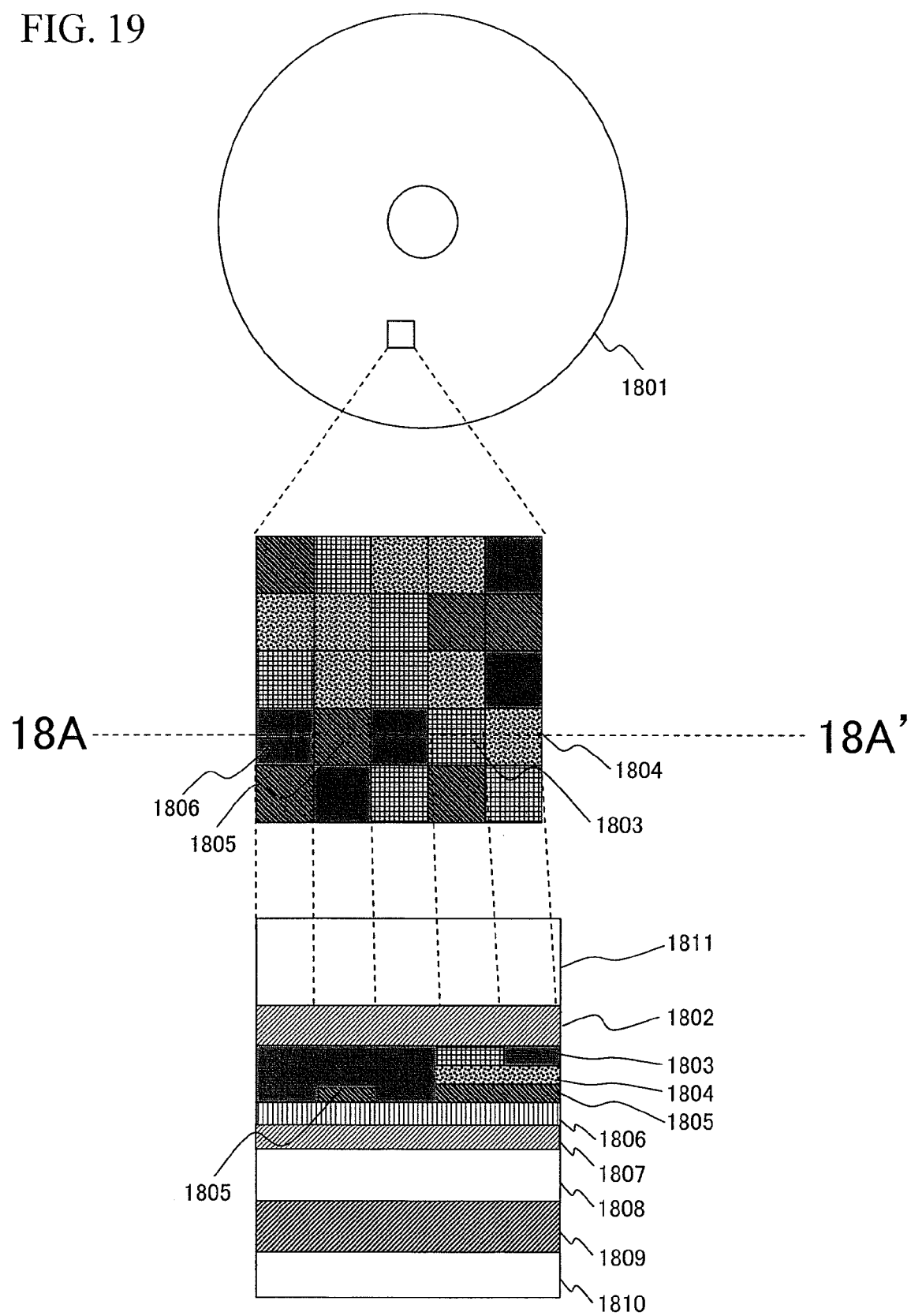
FIG. 19 schematically shows an optical disk that has been subjected to figure writing.

FIG. 19 shows the structure of an optical disk 1801 having a voltage-layer-selection-type figure writing layer, and an example of a figure written in the writing layer. The figure writing layer is formed of three electrochromic layers 1803, 1804, and 1805 having different reflectivity peaks; electrode layers 1802 and 1807 for applying voltage to the electrochromic layers; and an electrolyte layer 1806. The three electrochromic layers 1803, 1804, and 1805 and the electrolyte layer 1806 are laminated one on top of another, and the laminate is sandwiched between a pair of electrode layers 1802 and 1807. The electrochromic layer 1803 consisted of a $WO_3$ layer; the electrochromic layer 1804 consisted of a $MoO_3$ layer; the electrochromic layer 1805 consisted of a $TiO_2$ layer; the electrolyte layer consisted of a $Ta_2O_5$ layer; and the electrode layer consisted of an ITO layer. The figure writing layer, which is formed on a protection substrate 1811 having a tracking groove or pattern, is affixed to a data recording layer 1809 formed on a separate substrate 1810 having a tracking groove or pattern via a spacer layer 1808, thereby forming the optical disk 1801.

When writing a figure in the figure writing layer, an optimum voltage is applied by the voltage applying mechanism between the electrode layers 1802 and 1807 so as to cause a reflectivity change in the electrochromic layer, followed by laser irradiation. The optimum voltage refers to a voltage in a range such that the colored and decolored states are reversibly produced by repeating the application and terminating of voltage. In the present example, the optimum voltage was in a range of 1.5 to 6V By selecting the voltage applied between the electrode layers 1802 and 1807, it becomes possible to cause one of the three electrochromic layers 1803, 1804, and 1805 to be selectively colored.

Upon figure writing, voltage was applied between the electrode layers 1802 and 1807 for the figure writing layer; after the reflectivity of a desired electrochromic layer increased, energy irradiation was conducted. The figure writing layer of this type is transparent in the absence of writing. Thus, a region is formed in the figure writing layer that does not become colored by a thermal change in the electrochromic layer. The temperature at which a thermal change occurs varies depending on each electrochromic layer; it was 805° C. for the electrochromic layer 1803; 860° C. for the electrochromic layer 1804; and 970° C. for the electrochromic layer 1805. When the individual layers have such different layer-change-causing temperatures, each layer can be controlled to be in either an amorphous state or a crystal state by controlling the laser power and time duration. In this way, multicolor writing could be carried out. Thereafter, three color regions became visible upon simultaneous voltage application.

In the present embodiment, too, it is possible to make the characters or a figure written in the figure writing layer visible without voltage application. For this purpose, after the visible, multicolor figure has been written, a voltage higher than the optimum voltage by 2V or more is continuously applied to the electrochromic layers 1803, 1804, and 1805 for five minutes or longer. In this way, even after the voltage is terminated, it becomes possible to make the colored region remain colored without applying voltage to the electrochromic layers 1803, 1804, and 1805, thereby making it possible to make the multicolor figure written in the figure writing layer visible.

The writing method, medium configuration and material, information recording and reproduction method and apparatus, and the like that have not been particularly mentioned with reference to the foregoing embodiment are the same as those of Embodiment 1.

Embodiment 4

Figure 20:
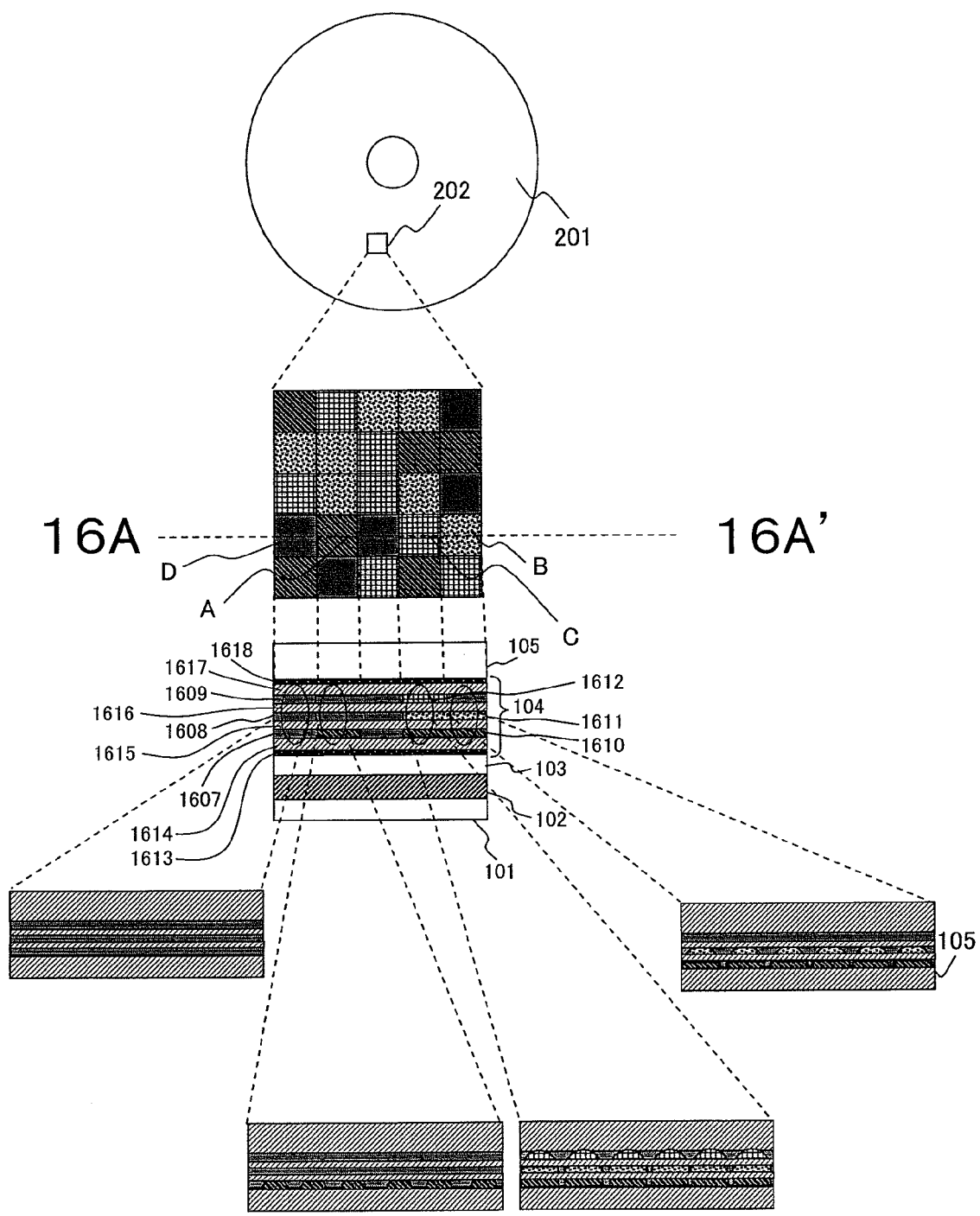
FIG. 20 schematically shows an optical disk that has been subjected to figure writing.

FIG. 20 schematically shows another configuration of an optical disk of the invention and an example of writing in the figure writing layer of the optical disk.

An optical disk 201 of the present embodiment includes a data recording layer 102 and a figure writing layer 104. The figure writing layer 104 includes: three phase change layers 1607, 1608, and 1609 having the same melting point; protection layers 1614, 1615, 1616, and 1617; a light-incident-side reflective layer 1613; and a back-side reflective layer 1618. Each of the phase change layers is sandwiched between upper and lower protection layers.

The optical disk 201 was fabricated in the following manner. On a substrate 101 having a tracking groove or pattern, the data recording layer 102, which consisted of $ZnS$—$SiO_2$, $Ge$—$Sb$—$Te$, and $ZnS$—$SiO_2$, was formed. Meanwhile, on a protection substrate 105 having a tracking groove or pattern, the following layers were sequentially formed: the back-side reflective layer 1618 consisting of Ag—Pd—Cu; the protection layer 1617 consisting of $SnO_2$; the phase change layer 1609 consisting of $Ge_5Sb_{70}Te_{25}$; the protection layer 1616 consisting of $SnO_2$; the phase change layer 1608 consisting of $Ge_5Sb_{70}Te_{25}$; the protection layer 1615 consisting of $SnO_2$; the phase change layer 1607 consisting of $Ge_5Sb_{70}Te_{25}$; the protection layer 1614 consisting of $SnO_2$; and the light-incident-side reflective layer 1613 consisting of Ag—Pd—Cu. Thereafter, they were both affixed to each other via a spacer layer 103, thereby constructing the optical disk 201. The melting point of the phase change layers 1607, 1608, and 1609 was 560° C.; their crystallization temperature was 220° C.

Since in this medium the protection layer is formed of a material having a high thermal conductivity, differences are caused in the conduction of heat such that the heat increasingly expands toward the light incident side, thereby making the crystallized region narrower. Therefore, it becomes possible to change the amorphous state (1607, 1608, and 1609) to the crystal state (1610, 1611, 1612) by controlling the laser power and time duration even when the phase change layers have the same composition.

In the optical disk shown in FIG. 20, after writing in the figure writing layer 104, a desired phase change layer 1607, 1608, or 1609 is changed from amorphous state to crystal state 1610, 1611, or 1612 on an element region by element region basis by controlling the laser power and its irradiation time. For example, in a region A of the figure writing layer 104, irradiation energy was controlled to produce a low temperature, whereby the phase change layer 1607 on the light incident side alone changed to crystal state while the phase change layers 1608 and 1609 remained in amorphous state. In a region B, irradiation energy was controlled to produce a higher temperature, whereby the phase change layers 1607 and 1608 changed to crystal state. In a region C, irradiation energy was controlled to produce the highest temperature, whereby all of the phase change layers 1607, 1608, and 1609 changed from amorphous state to crystal state.

As a result, in region A, the white light that becomes incident on the protection substrate 105 side is subject to strong interference between the back-side reflective layer 1618 and the phase change layer 1607, resulting in absorption of shorter wavelengths and reflection of longer wavelengths. Th reflection spectrum has a peak at around 800 nm and therefore exhibits red. In region B, the white light that becomes incident on the protection substrate 105 side is subject to strong interference between the back-side reflective layer 1618 and the phase change layer 1608, resulting in absorption of shorter wavelengths at around 350 nm and longer wavelength at around 700 nm, and reflection of an intermediate wavelength range of about 450 to 500 nm. The reflection spectrum has a reflection peak at around 480 nm and therefore exhibits green. In region C, the white light that became incident on the protection substrate 105 side is subject to strong interference between the back-side reflective layer 1618 and the phase change layer 1609, resulting in absorption of longer wavelengths. The reflection spectrum has a reflection peak at around 410 nm and therefore exhibits blue. In region D, all three layers remain in amorphous state; although there is weak interference, no difference in absorption or reflection is seen in virtually the entire visible wavelength range, so that the reflection spectrum does not have a peak at any particular wavelength and therefore exhibits black. The writing method, the medium configuration and material, the information recording and reproduction method and apparatus that have not been particularly mentioned above are the same as those of Embodiment 1.

What is claimed is:

1. An optical disk comprising:
a data recording layer configured to record data; and
a figure writing layer configured to write a visible figure;
wherein the figure writing layer includes a reflective layer and a plurality of other layers;
wherein the data recording layer and the figure writing layer are affixed to each other via a spacer layer;
wherein the plurality of other layers comprises films configured to undergo a phase change between a crystal state and an amorphous state by way of energy irradiation;
wherein user data is recorded in the data recording layer, or a visible figure is written in the figure writing layer, by optical irradiation;
wherein each of the films configured to undergo a phase change between a crystal state and an amorphous state produces an atomic arrangement change at a different temperature; and
wherein of the films configured to undergo a phase change between a crystal state and an amorphous state, those that are closer to the light incident side produce an atomic arrangement change at lower temperatures.

2. The optical disk according to claim 1, wherein the films configured to undergo a phase change between a crystal state and an amorphous state have the same melting point.

3. The optical disk according to claim 1, wherein a figure is written in the figure writing layer by causing, via optical irradiation, a change in the optical condition of a desired number of films configured to undergo a phase change between a crystal state and an amorphous state.

4. The optical disk according to claim 1, wherein the data recording layer is disposed on the side on which figure writing light is incident with respect to the figure writing layer.

5. The optical disk according to claim 1, wherein the figure written in the figure writing layer is visible as a multicolor figure.

6. The optical disk according to claim 1, wherein the films configured to undergo a phase change between a crystal state and an amorphous state by way of energy irradiation are configured to be erased by rendering the crystal state back to an amorphous state by way of high laser power irradiation.

* * * * *